United States Patent
Nishikata et al.

(10) Patent No.: US 9,201,469 B2
(45) Date of Patent: Dec. 1, 2015

(54) MOBILE COMMUNICATION TERMINAL AND APPLICATION PROGRAM

(75) Inventors: Naomi Nishikata, Shizuoka (JP); Takahisa Mizuno, Shizuoka (JP); Hideyuki Ikeda, Kanagawa (JP); Hirohisa Kusuda, Tokyo (JP)

(73) Assignee: Vodafone Group PLC, Berkshire (GB)

( * ) Notice: Subject to any disclaimer, the term of this patent is extended or adjusted under 35 U.S.C. 154(b) by 418 days.

(21) Appl. No.: 10/568,240

(22) PCT Filed: Oct. 14, 2004

(86) PCT No.: PCT/JP2004/015157
§ 371 (c)(1),
(2), (4) Date: Feb. 14, 2006

(87) PCT Pub. No.: WO2005/039154
PCT Pub. Date: Apr. 28, 2005

(65) Prior Publication Data
US 2006/0262012 A1    Nov. 23, 2006

(30) Foreign Application Priority Data

Oct. 16, 2003  (JP) ................................. 2003-356855
Dec. 4, 2003   (JP) ................................. 2003-405465

(51) Int. Cl.
*G06F 1/16*     (2006.01)
*H04M 1/725*    (2006.01)

(52) U.S. Cl.
CPC ............ *G06F 1/1694* (2013.01); *G06F 1/1616* (2013.01); *H04M 1/72525* (2013.01); *H04M 2250/12* (2013.01)

(58) Field of Classification Search
CPC ....... G06F 1/1694; G06F 9/544; H04L 67/34; H04M 2250/12
USPC .............................................. 455/556.1, 557
See application file for complete search history.

(56) References Cited

U.S. PATENT DOCUMENTS 6,650,892 B1*  11/2003  Thiriet .......................... 455/419
7,069,044 B2*   6/2006  Okada et al. ............... 455/556.1
(Continued)

FOREIGN PATENT DOCUMENTS

JP    2000-347867    12/2000
JP    2001-251674     9/2001
(Continued)

OTHER PUBLICATIONS

Tsuda, Hiroyume, "GPS Pedestrian's Navigator 'EZ Navigator Walk' Responding to KDDI BREW" (in Japanese), Oct. 6, 2003, Impress Corp., http://k-tai.impress.co..jp/cda/article/news_toppage/15913.html.
(Continued)

*Primary Examiner* — Nam Huynh
(74) *Attorney, Agent, or Firm* — Knobbe Martens Olson & Bear LLP

(57) ABSTRACT

A mobile communication terminal is disclosed that is capable of utilizing detection result data obtained by detection means for detecting position, direction, attitude and/or movement in a platform-independent application program that can be registered and used by users. When downloading an application program to a mobile communication terminal and executing it, first, the application execution environment is activated and the application program is executed under the environment. The started application program sends an acquisition request for acceleration data to the phone platform. When the phone platform accepts the acquisition request, it passes acceleration data detected by an acceleration sensor to the application program. Accordingly, the application program can perform a process utilizing the acceleration data.

23 Claims, 14 Drawing Sheets

(56) References Cited

U.S. PATENT DOCUMENTS

| | | | |
|---|---|---|---|
| 7,175,529 B2* | 2/2007 | Hartman et al. | 463/39 |
| 2002/0103942 A1* | 8/2002 | Comeau | 709/321 |
| 2003/0157961 A1* | 8/2003 | Glover | 455/557 |
| 2004/0029640 A1* | 2/2004 | Masuyama et al. | 463/43 |
| 2005/0033515 A1* | 2/2005 | Bozzone | 701/214 |
| 2006/0129628 A1* | 6/2006 | Kamiya et al. | 709/203 |

FOREIGN PATENT DOCUMENTS

| | | |
|---|---|---|
| JP | 2001-257746 | 9/2001 |
| JP | 2001-272413 | 10/2001 |
| JP | 2001-309446 | 11/2001 |
| JP | 2002-169645 | 6/2002 |
| JP | 2003-030775 | 1/2003 |
| JP | 2003-111142 | 4/2003 |
| JP | 2003-152617 | 5/2003 |
| JP | 2003-260269 | 9/2003 |

OTHER PUBLICATIONS

Ishida, Shin-ichi, "[CEATAC JAPAN2003] The Age When a Cellular Phone Shows You the Way . . . " (in Japanese), Oct. 8, 2003, IRI Commerce and Technology Inc., http://response.jp/issue/2003/1008/article 54569_1.html.

* cited by examiner

MOBILE COMMUNICATION TERMINAL AND APPLICATION PROGRAM

TECHNICAL FIELD

The present invention relates to a mobile communication terminal such as mobile phones capable of executing application programs and the application programs.

BACKGROUND ART

In the past, mobile phones capable of executing application programs written in object-oriented programming languages which are independent of platforms is well known for this kind of mobile communication terminal. For example, a mobile phone installed with JAVA (Trademark) virtual machine functions in order to execute application programs written in JAVA (Trademark) is well known (refer to Patent Document 1). Such mobile phones are able to utilize various application programs acquired e.g. by downloading from predetermined servers. It is the same for application programs executing on a BREW (Trademark) application execution environment.

Patent Document 2 discloses a mobile phone comprising a sensor (detection means) to detect acceleration or angular velocity. This mobile phone is able to display data related to acceleration or angular velocity detected by the sensor to display means. Patent Document 3 discloses a mobile phone comprising a sensor (detection means) to detect acceleration. This mobile phone is able to calculate its trajectory by using acceleration detected by the sensor, and to recognize the trajectory as input characters. Patent Document 4 discloses a mobile phone comprising a geomagnetic sensor (detection means) to detect bearing. On this mobile phone, two or more bearings are associated with numeric values so that it is possible to input numeric values by directing the mobile phone body to a specific bearing.

Patent Document 1: Japanese Unexamined Patent Application Publication No. 2000-347867
Patent Document 2: Japanese Unexamined Patent Application Publication No. 2001-272413
Patent Document 3: Japanese Unexamined Patent Application Publication No. 2002-169645
Patent Document 4: Japanese Unexamined Patent Application Publication No. 2003-111142

DISCLOSURE OF INVENTION

Problems to be Solved by the Invention

Mobile phones described in the Patent Document 2, 3 and 4, are capable of detecting position, direction, attitude or movement of mobile phones based on the sensor detection results. There is no specific description concerning control of such kinds of sensors in the patent documents. However, they may be controlled by phone platforms. Also, there is no specific description concerning storage location of data such as acceleration detected by various kinds of sensors are stored in the patent documents. However, the storage location is typically a platform memory area (first memory means) controlled by the phone platform. Therefore, in conventional mobile phones, programs utilizing data such as acceleration (detection result data) stored in the platform memory area must work directly on the phone platform controlling the memory area. Accordingly, although there is no clear description in the Patent Document 2, 3 and 4, in mobile phones disclosed in the patent documents, various kinds of processes using the detection result data is carried out by the programs working directly on the phone platforms. Since such programs are dependent on the phone platform, they are usually pre-registered in the mobile phones and provided to users. Therefore, even if a new program utilizing detection result data was developed, users would not be able to register the program to their mobile phones and would not be able to use it.

On the other hand, an application program written in foregoing JAVA (Trademark) works on an application execution environment such as JAVA (Trademark) virtual machine for executing the application program, and so the application program is independent of the phone platform. Therefore, as described above, it is possible for users to register the application programs in their mobile phones for use e.g. by downloading from predetermined servers. However, such application programs are only capable of utilizing data stored in the application memory area (second memory means) controlled on the application execution environment. This means that data stored in the platform memory area controlled by the phone platform cannot be used directly. Furthermore, in conventional mobile phones, there is no means to transfer detection result data such as acceleration detected by various kinds of sensors from the platform memory area to the application memory area. Therefore, application programs independent of platforms such as application programs written in JAVA (Trademark) could not perform a process using detection result data. This is the same for application programs executing on a BREW (Trademark) application execution environment.

The above explanation is given by taking a mobile phone for example; however, it is the same for other mobile communication terminals.

Application programs such as platform-dependent programs working directly on the foregoing phone platforms receive data such as acceleration detected by the various kinds of sensors (detection data) and use it as is. However, typically, it is unlikely for the application programs to utilize the received detection data as is. Specifically, the application programs often assign the received detection data into certain expressions for calculation or associate the received detection data with other data acquired by some means other than sensors. Even in case of utilizing the detection data as is, the application program often specify detection data that have met predetermined conditions. Therefore, conventionally, pre-processing has been performed to calculate, associate with other data, or specify detection data that have met the predetermined conditions, according to the application program contents. To perform the pre-processing, application program contents became more complicated. As a result, it cannot be said that application program development was easy. Application program development being not easy, the providing of various application programs utilizing detection data from various kinds of sensors is prevented, resulting in problems of declining usability of mobile phones with various kinds of sensors.

The above explanation is given by taking a mobile phone for example; however, it is the same for other mobile communication terminals. Also, the above explanation is given by taking application programs dependent on phone platforms for example; however, it is the same for platform-independent application programs that can be registered and used by users.

The present invention has been accomplished in view of the above-described background. An object of the present invention is to provide a mobile communication terminal capable of utilizing detection result data acquired by detection means for detecting position, direction, attitude and/or movement in a platform-independent application program that can be registered and used by users and to the application program.

Another object of the present invention is to provide a mobile communication terminal that allows the easy development of application programs utilizing detection data from detection means and offer greater usability by comprising this detection means.

Means for Solving the Problems

To achieve the object, a mobile communication terminal according to the present invention is a mobile communication terminal comprising first memory means and second memory means for memorizing data, and application program execution means for executing an application program using data memorized in the second memory means, the mobile communication terminal being characterized by comprising: detection means for detecting at least one of position, direction, attitude and movement; memory process means for performing memory process to memorize detection result data acquired based on detection results by the detection means in the first memory means; and data transfer means for transferring the detection result data memorized in the first memory means to the second memory means, according to a data transfer instruction from the application program execution means; wherein the application program execution means executes the application program using the detection result data memorized in the second memory means.

This mobile communication terminal is comprised of the first memory means for memorizing detection result data acquired by the detection means, and the second memory means for memorizing data that can be utilized by the application program execution means. With such second memory means, the application program execution means can execute platform-independent application programs. Such application programs, which are different from platform-dependent application programs, can be registered and utilized by users. When a data transfer instruction is output from the application program execution means, the detection result data memorized in the first memory means are transferred to the second memory means according to the instruction. Therefore, the application program execution means can now execute application programs for performing a process using the detection result data acquired by the detection means.

On the foregoing mobile communication terminal, the application program execution means preferably has an instruction set for generating the data transfer instruction according to description in the application program. For the application program execution means for utilizing the detection result data while executing the application program, an data transfer instruction to transfer the detection result data in the first memory means to the second memory means must be generated. So, on this mobile communication terminal, the instruction set for generating the data transfer instruction is already installed in the application program execution means. Therefore, by simply adding description for using the instruction set in an application program, the application program execution means executing the application program can now utilize the detection result data.

An application program according to the present invention is an application program executable on the mobile communication terminal, characterized in that a computer in the mobile communication terminal works so that the application program execution means generates the data transfer instruction using the instruction set, by being executed by the application program execution means in which the instruction set for generating the data transfer instruction is pre-installed.

This application program can perform a process utilizing detection result data acquired by the detection means, using the instruction set pre-installed in the application program execution means. Receiving and/or passing of the application program may be performed via recording media such as FD or CD-ROM in which the program is recorded as digital information, or may be performed via communication lines such as mobile communication network.

Another mobile communication terminal according to the present invention is a mobile communication terminal comprising memory means for memorizing data and application program execution means for executing an application program using data memorized in the memory means, the mobile communication terminal being characterized by comprising: a 3-axis magnetic sensor and a 2-axis acceleration sensor used as detection means for detecting at least one of position, direction, attitude and movement in accordance with a detection instruction generated by the application program execution means according to description of the application program; and memory process means for memorizing detection result data acquired based on detection results by the detection means in the memory means; wherein the application program execution means executes the application program using the detection result data memorized in the memory means.

In this mobile communication terminal, detection result data utilized by application programs are acquired based on detection results of the 3-axis magnetic sensor and the 2-axis acceleration sensor. By detecting geomagnetism using the 3-axis magnetic sensor, with simple configuration, an angle against the standard angle around each axis can be specified and the attitude of the mobile communication terminal can be specified. Also, by detecting geomagnetism using the 3-axis magnetic sensor, the direction of the mobile communication terminal, i.e. the bearing to which a specific direction on the mobile communication terminal is facing can be specified. Further, this mobile communication terminal can detect acceleration with the 2-axis acceleration sensor so that position and movement of the mobile communication terminal can be specified as well. For example, by integrating the acceleration acquired with the 2-axis acceleration sensor with time, velocity (movement) of the mobile communication terminal can be specified. And, for example, by combining the acceleration acquired from the 2-axis acceleration sensor with the detection results from the 3-axis magnetic sensor, the current position from the starting point of detection can be specified. As above described, according to this mobile communication terminal, with simple configuration, all of position, direction, attitude and movement can be specified.

Application programs executed by the application program execution means on this mobile communication terminal include not only platform-independent application programs but also platform-dependent application programs.

Further, another mobile communication terminal according to the present invention is a mobile communication terminal comprising application program execution means for executing an application program using data memorized in memory means, the mobile communication terminal being characterized by comprising detection means for detecting at least one of position, direction, attitude and movement of the mobile communication terminal; and data process means for performing data process of assigning the detection data of the detection means to predetermined arithmetic expression for calculation and storing the calculation result data in the memory means; wherein the application program execution means executes the application program using the calculation result data memorized in the memory means.

In this mobile communication terminal, data used by the application program execution means when executing application programs are calculation result data calculated by assigning the detection data of detection means to predetermined arithmetic expression for calculation. The calculation process is performed by the data process means different from the application program means. Accordingly, such a calculation process does not need to be performed in the application program execution means. As a result, the program contents related to the calculation process can be omitted from the application program contents. Therefore, for the application program requiring such a calculation process, the program contents can be simpler than conventional ones.

Application programs executed by the application program execution means on this mobile communication terminal include not only platform-independent application programs but also platform-dependent application programs.

Further, another mobile communication terminal according to the present invention is a mobile communication terminal comprising application program execution means for executing an application program using data stored in memory means, the mobile communication terminal being characterized by comprising: detection means for detecting at least one of position, direction, attitude and movement of the mobile communication terminal; and data process means for performing data processes of linking mutually between detection data of the detection means or data calculated from this detection data and other data acquired by means other than the detection means, and storing the linked data in the memory means; wherein the application program execution means executes the application program using the linked data stored in the memory means.

In this mobile communication terminal, data used by the application program execution means when executing an application program are other data acquired by means other than the detection means, and detection data that are linked to the other data or data calculated from the detection data. And the linking between the data is performed by the data process means other than the application program execution means. Therefore, such data process does not need to be performed in the application program execution means. As a result, the program contents relating to the data process can be omitted from the application program contents. So, for the application programs requiring this data process, the program contents can be simpler than conventional ones.

Application programs executed by the application program execution means in this mobile communication terminal include not only platform-independent application programs but also platform-dependent application programs.

Further, another mobile communication terminal according to the present invention is a mobile communication terminal comprising application program execution means for executing an application program using data stored in memory means, the mobile communication terminal being characterized by comprising: detection means for detecting at least one of position, direction, attitude and movement of the mobile communication terminal; and data process means for performing a data process of specifying at least two of detection data of the detection means or data calculated from the detection data, which meet predetermined conditions, and storing the specified data in the memory means; the application program execution means executes an application program using the specified data stored in the memory means.

In this mobile communication terminal, data used by the application program execution means when executing application programs are at least two of detection data from the detection means or data calculated from this detection data, which have met predetermined conditions. And the data process to specify data, which has met the predetermined conditions, is performed by the data process means other than the application program execution means. Therefore, such data processing does not need to be performed in the application program execution means. As a result, the program contents relating to the data process can be omitted from the application program contents. So, for the application programs requiring this data process, the program contents can be simpler than conventional ones.

Application programs executed by the application program execution means on this mobile communication terminal include not only platform-independent application programs but also platform-dependent application programs.

The foregoing mobile communication terminal is preferably comprised of radio communication means for communicating outside by wireless communication utilizing radio waves and radio wave strength confirmation means for confirming strength of the radio waves utilized by the radio communication means at specified time intervals, wherein the data process means is used as at least one part of the radio wave strength confirmation means and performs the data process when confirming the radio wave strength. In this mobile communication terminal, the hardware functioning as the data process means is responsible for at least one part of hardware functioning as the radio wave strength confirmation means. In the case of performing both confirmation process of radio wave strength by the radio wave strength confirmation means and the data process by data process means at separate times, for example, redundant operations are performed when starting or stopping power supply to the hardware. Therefore, in this mobile communication terminal, when performing the radio wave strength confirmation process, a data process is also performed simultaneously by the data process means. Accordingly, the redundant operation can be omitted when performing the respective processes.

In the foregoing mobile communication terminal, the detection means preferably includes angle detection means for detecting an angle against the standard angle around a virtual axis leading to a predetermined direction. In this mobile communication terminal, attitude of the mobile communication terminal can be specified.

In the foregoing mobile communication terminal, the detection means preferably includes acceleration detection means for detecting the acceleration in a predetermined direction working on the mobile communication terminal. In this mobile communication terminal, position and/or movement of the mobile communication terminal can be specified.

For the "Mobile Communication Terminal", phones capable of executing application programs can be listed, which may be among mobile phones of PDC (Personal Digital Cellular) system, GSM (Global System for Mobile Communication) system or TIA (Telecommunications Industry Association) system etc., mobile phones standardized in IMT (International Mobile Telecommunications)-2000, mobile phones of TD-SCD MA (MC: Multi Carrier) system which is one of TD-SCDMA (Time Division Synchronous Code Division Multiple Access), PHS (Personal Handyphone System) phones, automobile telephones, etc. Also, for this "Mobile Communication Terminal", mobile types of mobile communication terminals without phone function, such as PDA (Personal Digital Assistance) can be listed as well.

Effect of the Invention

According to a mobile communication terminal and an application program concerned with the present invention, in a platform-independent application program that can be registered and utilized by users, detection result data acquired by detection means for detecting position, direction, attitude and movement can be utilized.

According to another mobile communication terminal concerned with the present invention, development of application program using detection data of detection means can be made easier and offers greater usability by comprising of the detection means.

EXPLANATION OF THE SYMBOLS

10 Mobile Phone Network
11 Download Server
20 Mobile Phone
207 Acceleration Sensor
208 Geomagnetic Sensor
212 Data Communication Unit
213 Operation Unit
214 Application Program Execution Management Unit
215 Main Control Unit
216 Output Unit
217 Sensor Detection Unit

BEST MODE FOR CARRYING OUT THE INVENTION

[First Embodiment]

First, the first embodiment of the present invention will be described.

Figure 1:
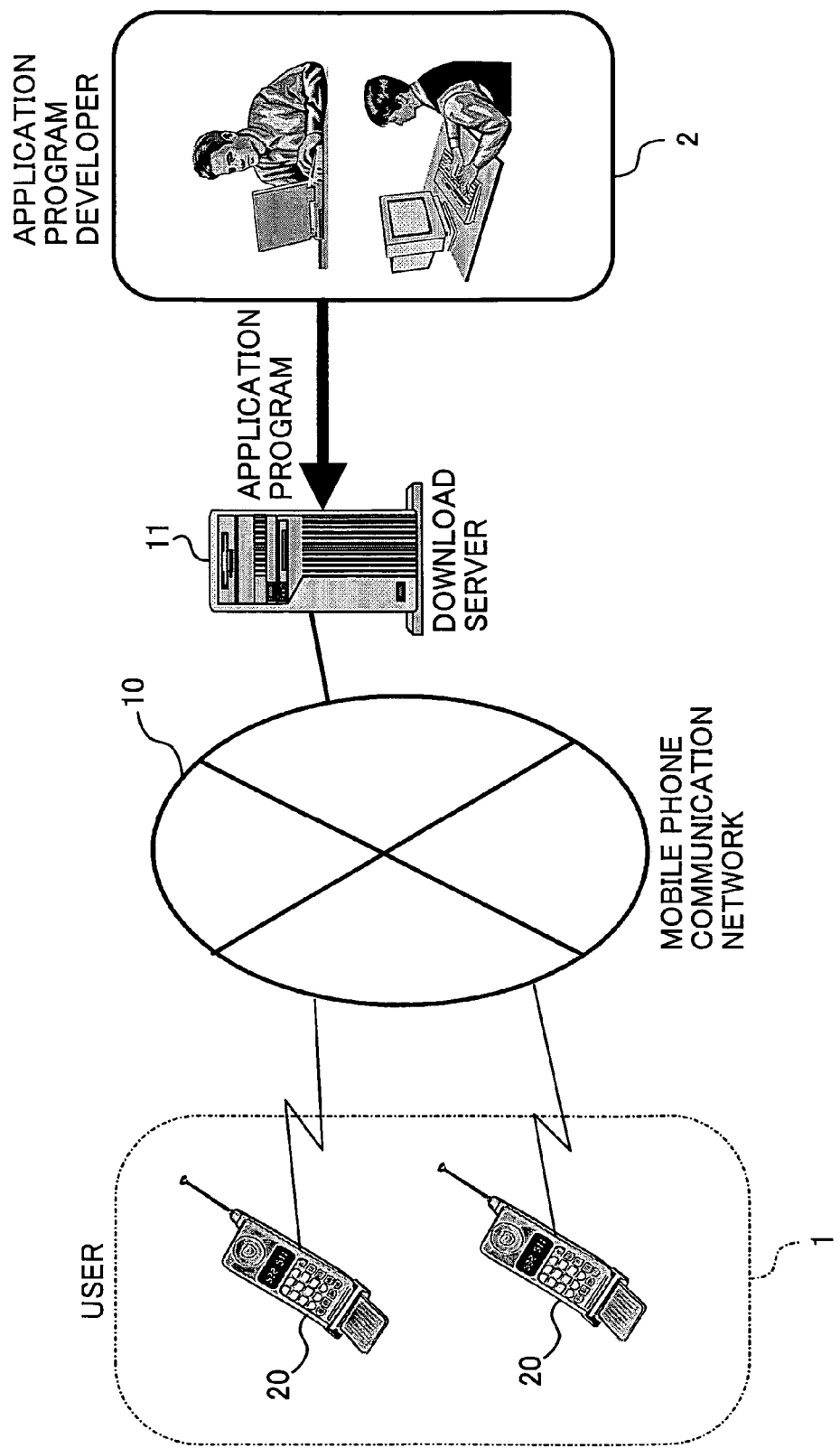
[FIG. 1] Illustration explaining the overall configuration of a mobile communication system that can be utilized by a mobile phone according to first embodiment.

FIG. 1 shows an illustration explaining the overall system configuration of a mobile communication system that can be utilized by a mobile phone as a mobile communication terminal according to the present embodiment.

In this mobile communication system, the mobile phone 20 used by a user 1 has a configuration capable of executing an application program registered by the user 1. In the present embodiment, the application program is developed in platform-independent object-oriented programming. Such application programs include application programs written in JAVA (Trademark) and application programs executing on a BREW (Trademark) application execution environment. This mobile phone 20 can be connected to a mobile phone network 10 as a communication network. An application program download server (hereinafter referred to as a "download server") 11 as a server to provide programs is also connected to the mobile phone network 10. When accepting a download request from the mobile phone 20, it sends an application program according to the request to the mobile phone 20.

An application program provided from the download server 11 is offered by the application program developer 2. Specifically, for example, an application program is provided by uploading it to the download server 11 via leased lines or public lines from a personal computer etc. in the application program developer 2. The application program may also be provided by sending recording media, such as optical disks or magnetic disks recording the developed application programs, from the application program developer 2 to a communication common carrier which manages and operates the download server 11, so that the application programs in the recording media will be read into the download server 11. The application programs provided in this way are registered to the download server 11 in a downloadable state in which the application program can be downloaded by the mobile phone 20 via the mobile phone network 10.

Figure 2:
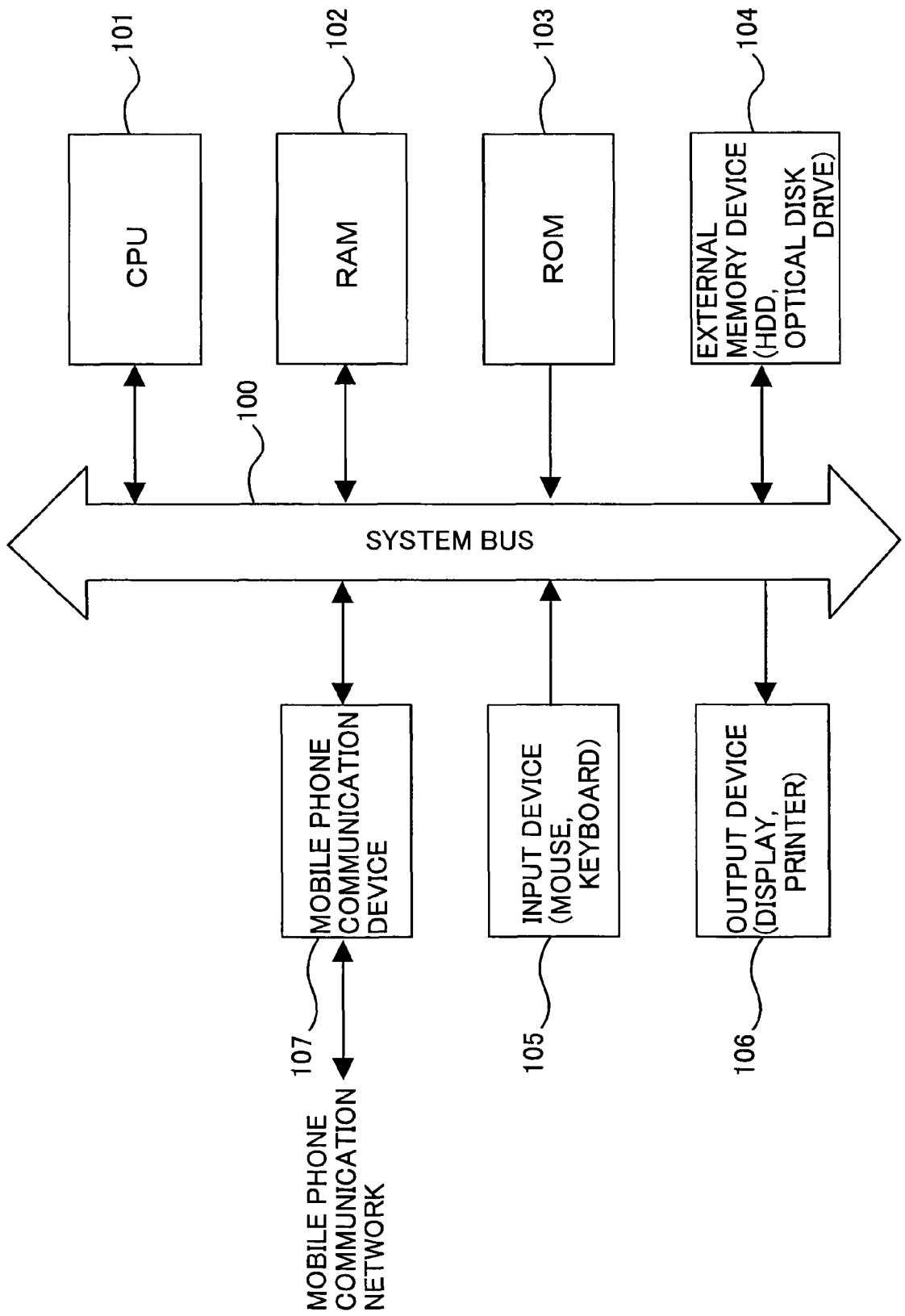
[FIG. 2] Schematic block diagram showing the hardware configuration of a download server forming the same mobile communication system.

FIG. 2 is a schematic block diagram showing the hardware configuration of the download server 11.

This download server 11 is comprised of a system bus 100, a CPU 101, an internal memory device, an external memory device 104, an input device 105 and an output device 106. The internal memory device is comprised of a RAM 102, a ROM 103 or the like. The external memory is comprised of a hard disk drive (HDD), an optical disk drive or the like. The input device 105 is comprised of an external memory device 104, a mouse, a keyboard or the like. The output device 106 is comprised of a display, a printer or the like. Further, this download server 11 is comprised of mobile phone communication device 107 to communicate the mobile phone 20 of each user 1 via the mobile phone network 10.

The configuration elements such as the CPU 101 and RAM 102, etc. exchange data and program instructions with each other via the system bus 100. Programs to work the download server 11 according to predetermined procedures are stored in ROM 103 and external memory device 104. The programs are called up to the working area in CPU 101 and ROM 102 to be executed as necessary. Also, in this download server 11, application programs to be provided to the mobile phone 20 are stored in the external memory device 104. The download server 11 has a function to send application programs stored in the external memory device 104 to the mobile phone 20, working with CPU 101, RAM 102, and the mobile phone network communication device 107, etc., according to the download request from the mobile phone 20. This download server 11 may be configured as a dedicated controller or may be configured using a general computer system. Also, the download server 11 may be configured with one computer or may be configured by networking two or more computers that are responsible for one of multiple functions respectively.

Figure 3:
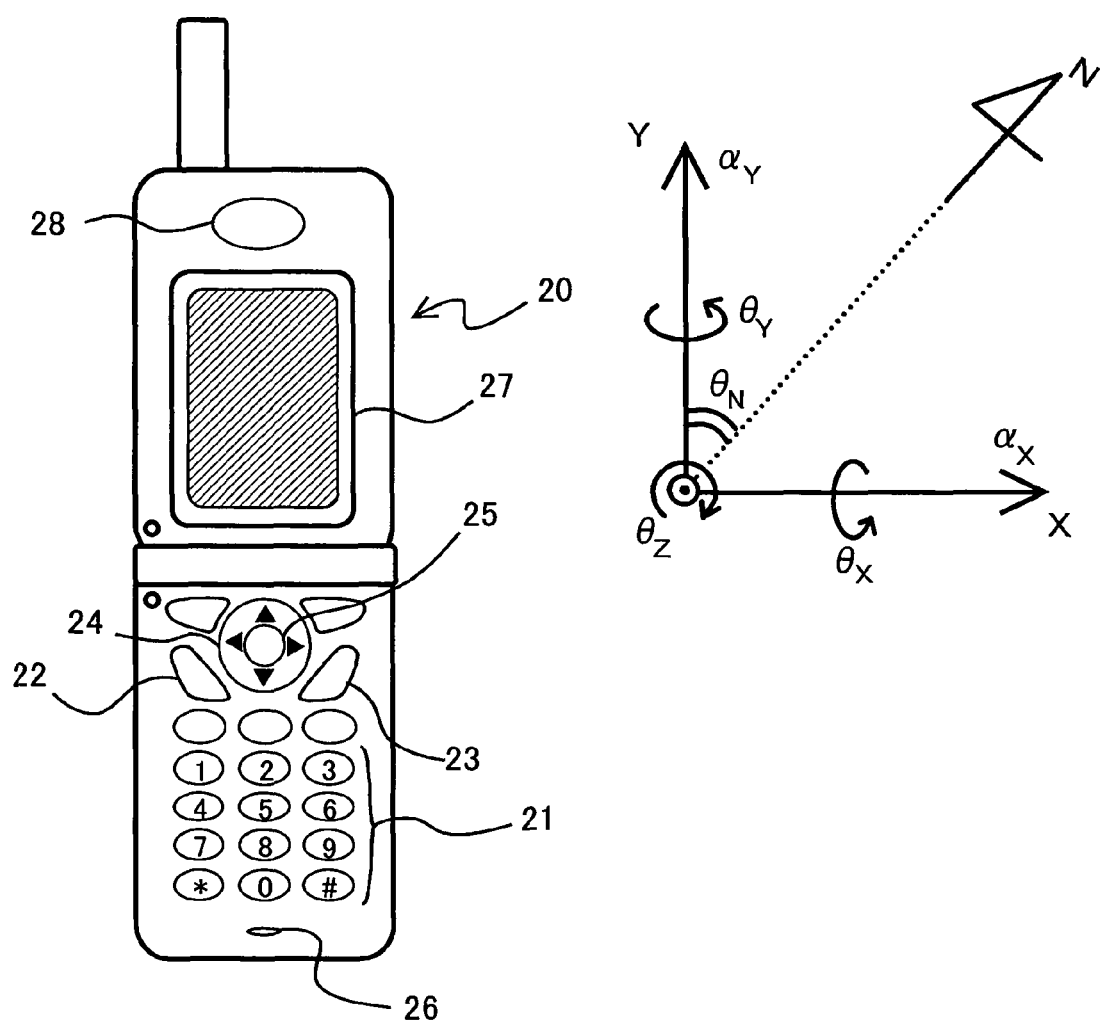
[FIG. 3] Illustration showing the external view of the same mobile phone and coordinates.
Figure 4:
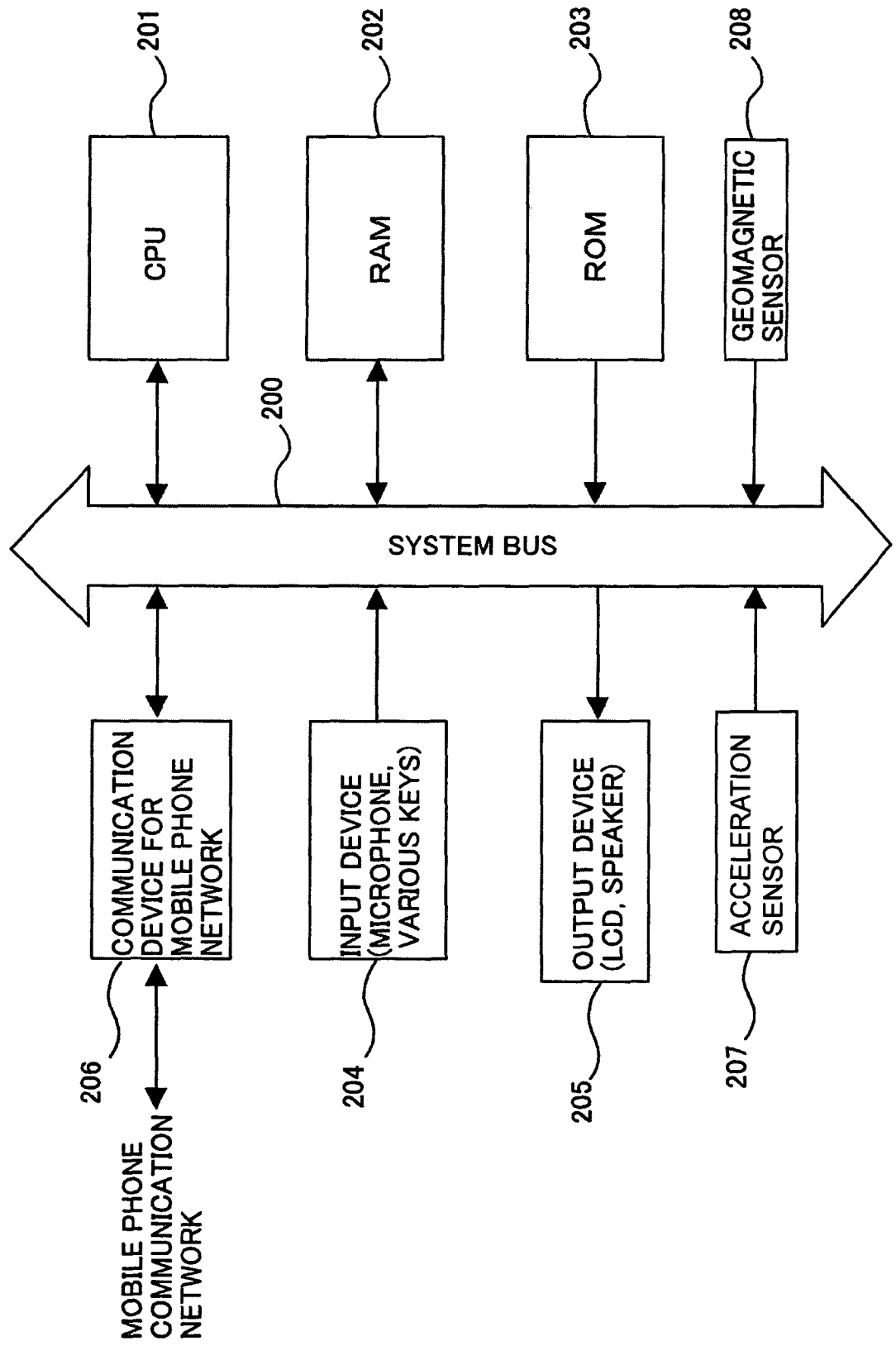
[FIG. 4] Schematic block diagram showing the hardware configuration of the same mobile phone.

FIG. 3 is an illustration showing the external view of the mobile phone 20 and coordinates, and FIG. 4 is a schematic diagram showing hardware configuration of the mobile phone 20.

This mobile phone 20 is a clam-shell (folding) type mobile phone, which is comprised of an internal controller comprising of a system bus 200, a CPU 201, a RAM 202 and a ROM 203 etc., an input device 204, an output device 205, a mobile phone communication device 206, an acceleration sensor 207 and a geomagnetic sensor 208. The configuration elements such as CPU 201 and RAM 202 etc. exchange various kinds of data and later mentioned program instructions, etc. with each other via the system bus 200. The input device 204 is comprised of data input keys (ten keys, * key, and #key) 21, a call start key 22, a call end key 23, a scroll key 24, a multi-function key 25, and a microphone 26, etc. The output device 205 is comprised of a liquid crystal display (LCD) 27, and a speaker 28, etc. The mobile phone communication device 206 is used to communicate with other mobile phones and the download server 11 via the mobile phone network 10. Also, a platform memory area as the first memory means controlled by after-mentioned phone platform, and an application memory area as the second memory means controlled on after-mentioned application execution environment exist in RAM 202.

The acceleration sensor 207 is a 2-axis sensor to detect acceleration $\alpha_X$ and $\alpha_Y$ in two directions (X-axis direction and Y-axis direction in FIG. 3) that are mutually perpendicular on the plain parallel to the image display face of LCD 27. This acceleration sensor 207 is mounted on a circuit board (not shown) provided inside the mobile phone 20, and a publicly known sensor capable of detecting the acceleration $\alpha_X$ and $\alpha_Y$ can be used as the sensor 207.

The geomagnetic sensor 208 is a 3-axis sensor to detect the direction of geomagnetism on three-dimensional coordinates consisting of the X-axis, Y-axis, and Z-axis perpendicular to these axes. In the present embodiment, angles $\theta_X$, $\theta_Y$, and $\theta_Z$ around X-axis, Y-axis and Z-axis respectively are detected utilizing the detection results of this geomagnetic sensor 208. Specifically, the amount changed when the direction of geomagnetism changes against the standard geomagnetic direction (standard direction) is detected using angles, $\theta_X$, $\theta_Y$, and $\theta_Z$ around X-axis, Y-axis and Z-axis. By this detection, when the mobile phone changes its attitude from the attitude where the geomagnetic direction is in the standard direction, the attitude after changing can be specified by each angle $\theta_X$, $\theta_Y$, and $\theta_Z$. In following explanation, the angle $\theta_X$ around X-axis is referred as a pitch angle, and the angle $\theta_Y$ around Y-axis is referred as a roll angle, and the angle $\theta_Z$ around Z-axis is referred as a yaw angle. By using the geomagnetic sensor 208, for example, the direction of the Y-axis facing against north can be detected. In this case, for example, the direction to which the mobile phone is facing can be specified with the angle between the Y-axis and the north bearing (hereinafter referred to as a "bearing angle") $\theta_N$. This geomagnetic sensor 208 is also mounted on the circuit board (not shown) provided inside the mobile phone 20.

These sensors 207 and 208 may be configured as separate devices from the main body of the mobile phone 20. In this case, for example, the external device and the main body of the mobile phone 20 should be configured to be incorporated by connecting the external device with these sensors 207 and 208 to external ports on the main body of the mobile phone 20.

Figure 5:
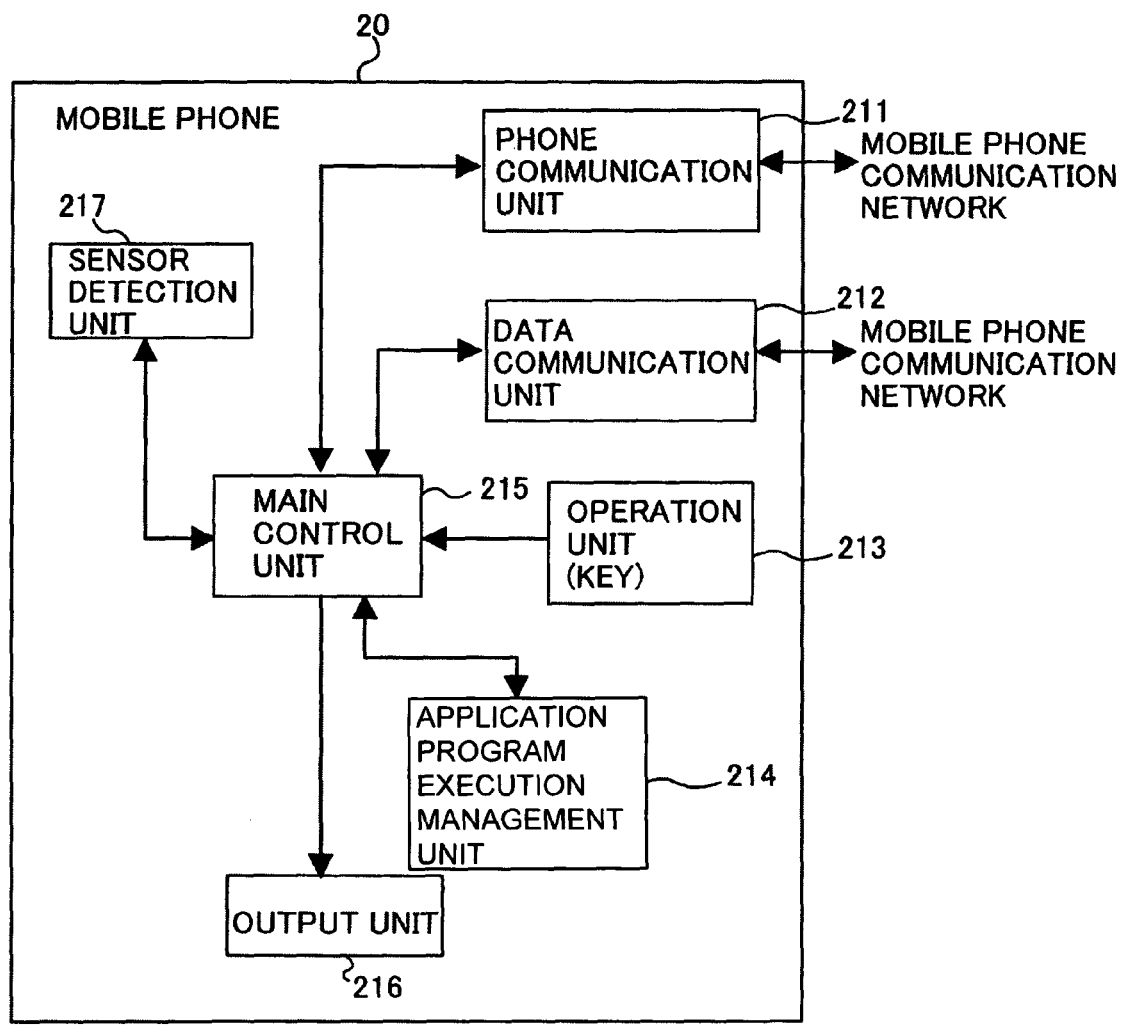
[FIG. 5] Block diagram showing the extracted main part of the same mobile phone.
Figure 6:
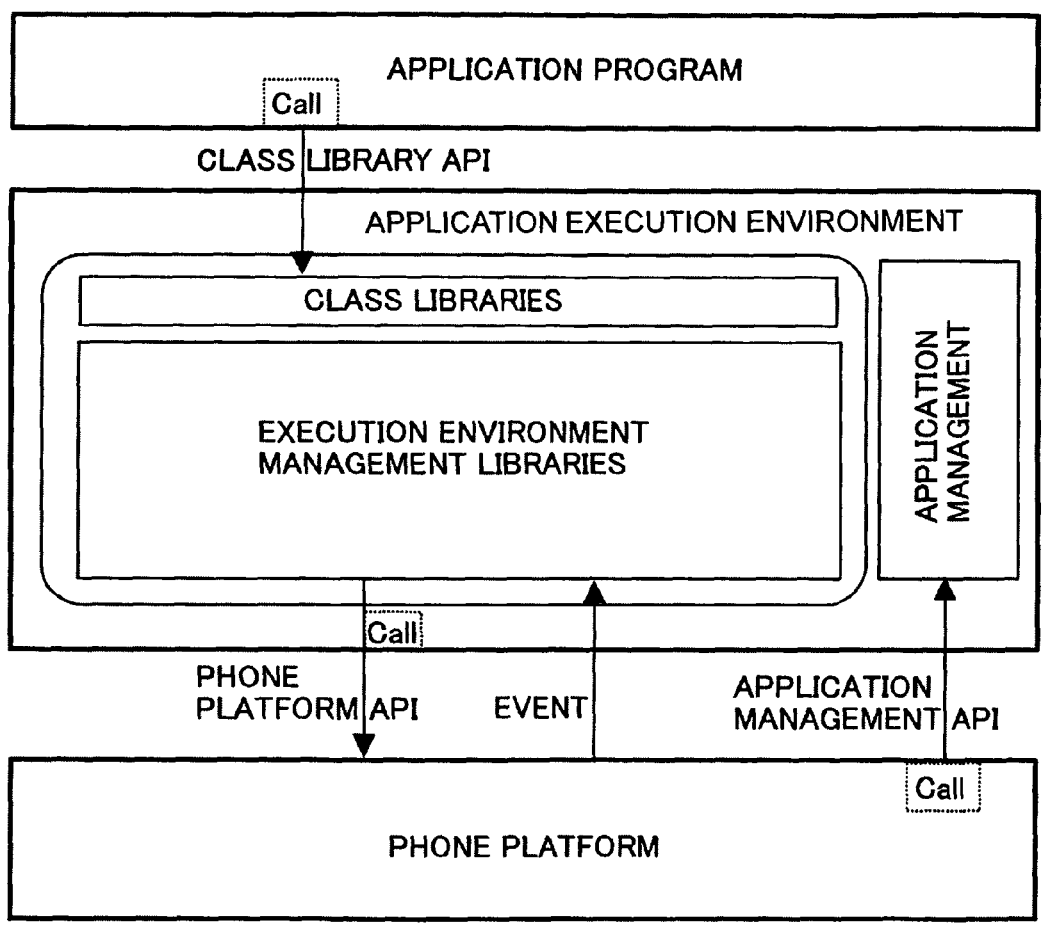
[FIG. 6] Illustration showing software configuration of the same mobile phone.

FIG. 5 shows a block diagram of the extracted main part of the mobile phone 20, and FIG. 6 is an illustration of software configuration of the mobile phone 20.

This mobile phone 20 is comprised of a phone communication unit 211, a data communication unit 212, an operation unit 213, an application program execution management unit 214, a main control unit 215, an output unit 216, and a sensor detection unit 217 as the detection means, etc. In the following operation example 1 and operation example 2, the application program execution management unit 214 works as the application program execution means. In the following operation example 3, the main control unit 215 works as the application program execution means.

The phone communication unit 211 performs radio communication with a base station of the mobile phone network 10 to make calls with other mobile phones and fixed phones. The phone communication unit 211 is corresponding to the mobile phone communication device 206 etc. in the above-described hardware configuration.

The data communication unit 212 is corresponding to the phone mobile communication device 206 etc. in the hardware configuration, as the same as the foregoing phone communication unit 211. This data communication unit 212 is used for exchanging mails with other mobile phones via the mobile phone network 10, and used for exchanging e-mails and browsing Web pages on the Internet by connecting to external communication networks such as the Internet via gateway servers from the mobile phone network 10. This data communication unit 212 is also used for downloading application programs provided by the download server 11 via the mobile phone network 10.

The operation unit 213 is comprised of the ten key 21, the call start key 22, and the call end key 23, etc which can be operated by the user 1. By operating this operation unit 213, users can enter data such as URL etc. into the mobile phone 20, start and/or end a call when receiving the call, and select, start and/or stop an application program. Users can also download application programs from the download server 11 by operating the operation unit 213.

The application program execution management unit 214 is comprised of the above-mentioned system bus 200, and a part of CPU 201 and RAM 202, etc. This application program execution management unit 214 is corresponding to "application execution environment" in the central of the configuration of FIG. 6, provides class libraries, execution environment management libraries and application management software etc. that are used in application programs developed by object-oriented programming, and manages the application program execution environment. This application execution environment is appropriately selected according to the executing application programs. For example, in the case in which the executing application program is written in JAVA (Trademark), a JAVA (Trademark) application execution environment will be selected. And, in the case in which the executing application program is written in C language functioning on BREW (Trademark) execution environment, a BREW (Trademark) application execution environment will be selected. In the case in which the executing application program is written in JAVA (Trademark), it can be executed by building a JAVA (Trademark) application execution environment on BREW (Trademark) application execution environment.

An application program can call up and use class libraries such as functions in the application execution environment via class library API (Application Interface). The history of calling class libraries such as functions is stored in the application memory area in RAM 202 until the virtual execution environment (Virtual Machine: VM) for the application program exits. Also, various kinds of data used when executing the application program are stored into the application memory area by the application execution environment. And when using these various kinds of data, they are written into or read from this application memory area. The execution environment management libraries in the application execution environment can be used by calling up phone platform libraries in an after-mentioned phone platform via phone platform API.

As hereinafter described in operation example 1 and 2, detection result data (acceleration $\alpha_X$, $\alpha_Y$ and a pitch angle $\theta_X$, a roll angle $\theta_Y$ and a yaw angle $\theta_Z$) detected by after-mentioned sensor detection unit 217 which is comprised of acceleration sensor 207 and geomagnetic sensor 208, etc. are utilized in application programs. In conventional application execution environments, there was no means for application programs to utilize the detection result data, so that in the present embodiment, a new class (Orientation class) is added in the class libraries. In this Orientation class, a method to get acceleration $\alpha_X$ and $\alpha_Y$ data and a method to get a pitch angle $\theta_X$, a roll angle $\theta_Y$, a yaw angle $\theta_Z$ are offered separately and some instruction sets can be defined. Therefore, according to the present embodiment, application programs can obtain the detection result data and utilize them by using these methods.

The main control unit 215 controls the phone communication unit 211, data communication unit 212, operation unit 213 and sensor detection unit 217, and is comprised of the system bus 200, CPU 201 and RAM 202, etc. This main control unit 215 exchanges control instructions and various kinds of data with application program execution management unit 214 and performs the control task by working with them. The main control unit 215 is corresponding to "phone platform" in the lowest part of the software configuration of FIG. 6, and executes a control program for controlling the phone communication unit 211 and a user interface, and provides phone platform libraries. This phone platform can execute various kinds of processes in application programs, and can call up the application control software in the application execution environment via application control API and use it, by sending events to execution environment control libraries in the application execution environment. Also, when the application execution environment calls up a phone platform library via phone platform API and uses it, the phone platform executes a process in accordance with the phone platform library. For example, the phone platform can read data stored in the platform memory area managed by the phone platform in RAM 202 and move this data to the application memory area, based on instructions from the application execution environment by utilizing phone platform libraries.

The output unit 216 is equipped with output device 205 etc. comprising the liquid crystal display 27 and a speaker 28 etc. This output unit 216 displays Web page received by the data communication unit 212 on the liquid crystal display 27. The liquid crystal display 27 of this output unit 216 is also used when notifying users that information is received by the phone communication unit 211 and data communication unit 212. Specifically, when receiving the information, a receiving notification image is displayed on the liquid crystal display 27 of output unit 216, and/or a receiving melody is output from the speaker 28 by main control unit 215. Further, while an application program executed on the application execution environment is executing, this output unit 216 is used for displaying menu screen image etc. and/or outputting music, which are related to execution of the program.

The sensor detection unit 217 is comprised of the acceleration sensor 207 and geomagnetic sensor 208, etc. This sensor detection unit 217 works under the control of the main control unit 215. The detection results are obtained by the main control unit 215. The acceleration $\alpha_X$ and $\alpha_Y$, and the pitch angle $\theta_X$, the roll angle $\theta_Y$, and the yaw angle $\theta_Z$ data indicated by the detection results are stored in the platform memory area in RAM 202 as above mentioned.

For example, when the position of mobile phone 20 is changed by the user 1, the acceleration working in the X-axis direction and Y-axis direction are detected by the acceleration sensor 207 forming the sensor detection unit 217. When the detection signal is input into the main control unit 215, the main control unit 215 calculates the X-axis direction acceleration ax and the Y-axis direction acceleration ay from the detection signal. The calculated acceleration data $\alpha_X$ and $\alpha_Y$ are stored in the platform memory area in RAM 202 by the main control unit 215 working as memory process means.

When the attitude of the mobile phone 20 is changed, the pitch angle $\theta_X$, the roll angle $\theta_Y$, and the yaw angle $\theta_Z$ after changing of the attitude are detected by the geomagnetic sensor 207 forming the sensor detection unit 217. When the detection signal is input into the main control unit 215, the main control unit 215 calculates each angle $\theta_X$, $\theta_Y$, and $\theta_Z$ after changing of the attitude by using the detection signal. The calculated angle $\theta_X$, $\theta_Y$, and $\theta_Z$ data are stored in the platform memory area in RAM 202 by the main control unit 215 in the same way as the acceleration $\alpha_X$ and $\alpha_Y$.

When the direction of the mobile phone 20 is changed, the bearing angle $\theta_N$ after changing of the direction is detected by the geomagnetic sensor 208 forming the sensor detection unit 217. When the detection signal is input into the main control unit 215, the main control unit 215 calculates bearing angle $\theta_N$ after changing of the direction by using the detection signal. The calculated bearing angle $\theta_N$ data is stored in the platform memory area in RAM 202 by the main control unit 215 in the same way as above.

The following methods can be adopted as a method for acquiring acceleration $\alpha_X$ and $\alpha_Y$ and each angle $\theta_X$, $\theta_Y$, and $\theta_Z$ data stored in the platform memory area from the sensor detection unit 217 by the main control unit 215. For example, there is an acquiring method in which the main control unit 215 sends a request to the sensor detection unit 217, and in accordance with this request, the main control unit 215 receives output data sent out from the sensor detection unit 217. Furthermore, for example, an acquiring method can be adopted, in which the main control unit 215 accordingly receives output data continuously sent out from the sensor detection unit 217 without any request. Also, an acquiring method can also be adopted, in which the main control unit 215 sends a request to the sensor detection unit 217 in accordance with a request sent out via the application program execution management unit 214 from the application program.

A control program to build a phone platform operating the mobile phone according to the predetermined procedure is stored in RAM 202 and/or ROM 203. A basic OS (Operating System) program, programs to build the application execution environment and application programs are stored in RAM 202 and/or ROM 203. These programs are called up as necessary to the working area of CPU 202 and/or RAM 202 and executed.

OPERATION EXAMPLE 1

Next, a process operation (hereinafter referred to as "Operation Example 1") to execute an application program using the acceleration $\alpha_X$ and $\alpha_Y$ will be described. The application program of the present operation example 1 makes the mobile phone 20 function as a mouse that is a pointing device for a portable-type personal computer such as a notebook-size personal computer or PDA, etc. Of course, it can work in the same way as a pointing device for desktop personal computers as well.

Figure 7:
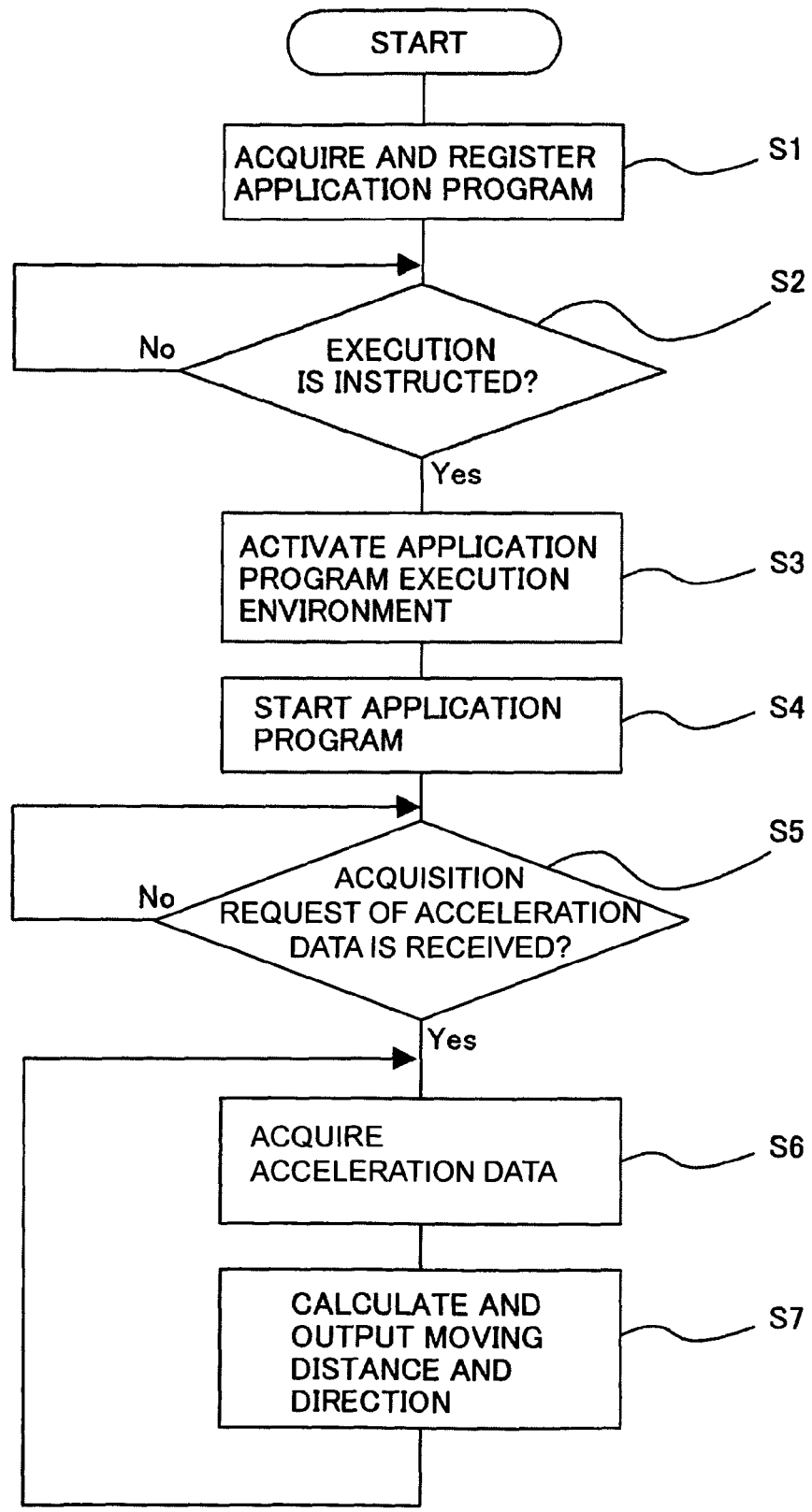
[FIG. 7] Flow chart showing the process flow to execute an application program in a mobile phone according to an operation example 1 of the first embodiment.

FIG. 7 is a flow chart showing the process flow to execute an application program in the present operation example 1.

First, the user 1 obtains a mouse application program from the download server 11 and registers this (S1). Specifically, the user 1 operates keys of the operating unit 213 and has access to the download server 11. Accordingly, a download selection screen for selecting a downloadable application program will be displayed on the liquid crystal display 27. Then, on the download selection screen, the user selects the mouse application program subject to execution by using the scroll key 24, and presses the multifunction key, so that the main control unit 215 downloads the application program from the download server 11 by controlling the data communication unit 212. In this way, the downloaded application program is saved in RAM 102 by the main control unit 215.

When executing the downloaded application program, first, the user 1 connects the external port of the mobile phone 20 to the USB (Universal Serial Bus) port of a notebook-size personal computer etc. Although the connection method in the present embodiment is a cable connection utilizing the USB port, methods using other cable connections or radio connections may be used. For the communication means used when this mobile phone 20 is connected to notebook-size personal computers etc., it is possible to use any communication means capable of data communication with notebook-size personal computers, which is not limited to the external port. Once the mobile phone 20 is connected to a notebook-size personal computer etc., the user 1 operates keys on the operation unit 213 to display an application selection menu used for selecting an application subject to be executed, on the liquid crystal display 27. Then, on the application selection menu, the mouse application program subject to be executed is selected using the scroll key 24, and the multifunction key 25 is pressed down. Then, an instruction for executing the application program will be input into the phone platform shown in FIG. 6, i.e. the main control unit 215 shown in FIG. 5 (S2). Accordingly, the main control unit 215 activates the application execution environment shown in FIG. 6, i.e. the application program execution management unit 214 shown in FIG. 5 (S3). Then, the application program execution management unit 214 works as the application program execution means, and reads out an application program for a mouse and starts it (S4).

After the mouse application program is started, the application program acquires the acceleration data $\alpha_X$ and $\alpha_Y$ detected by the sensor detection unit 217 in almost real time. Then, the application program calculates the moving distance and direction of the mobile phone 20 based on the acquired data. These moving distance and direction are continued to be output to notebook-size personal computers etc. via the external ports of the mobile phone 20 at predetermined short intervals.

Figure 8:
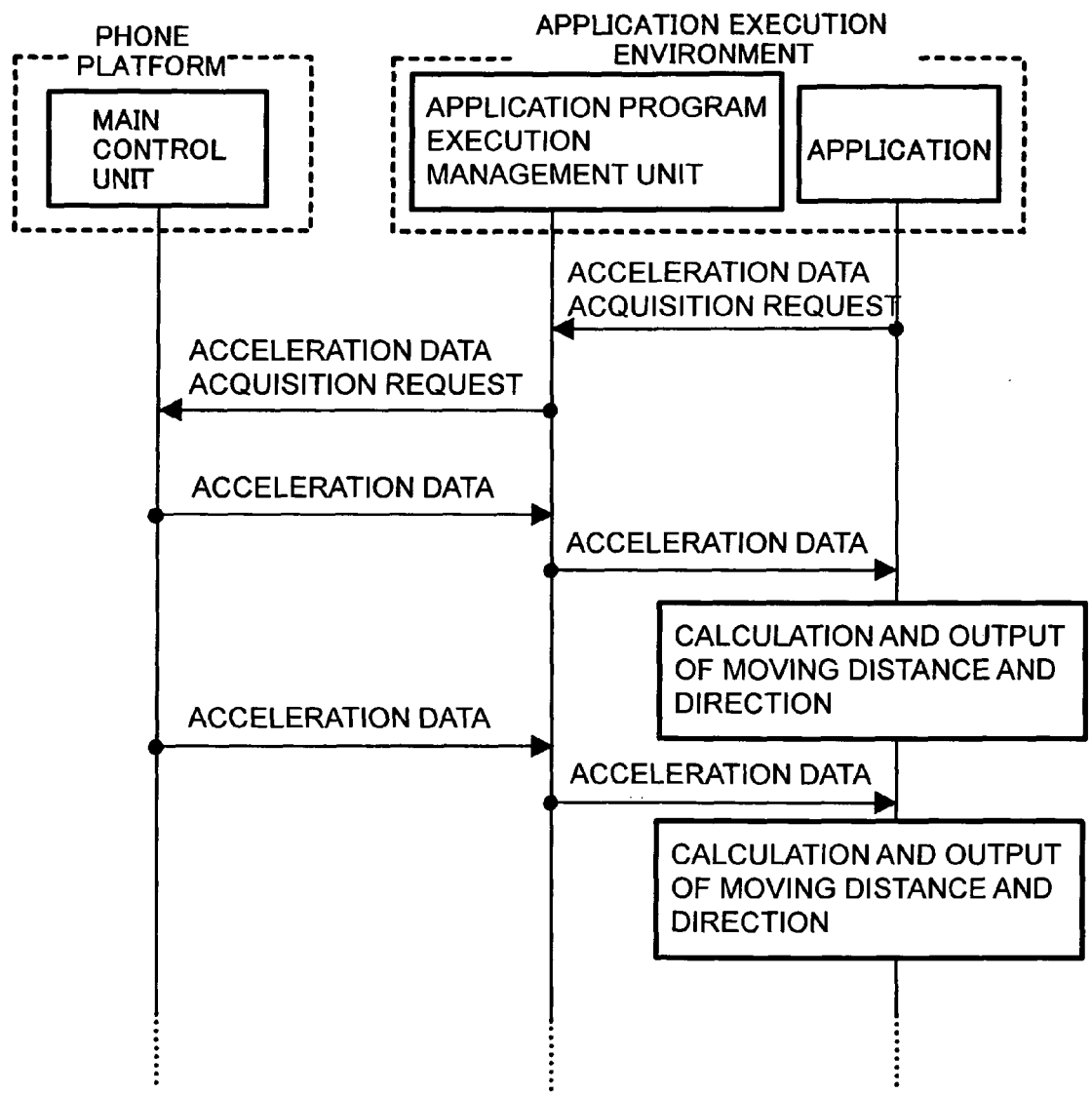
[FIG. 8] Sequence flow chart when executing an application program in the same mobile phone.

Specifically, as shown in FIG. 8, on the application execution environment, the started application program sends a request for acquiring acceleration data to the application program execution management unit 214. In the present operation example 1, since instruction sets of getXGravity( ) and getYGravity( ) are defined as methods to acquire the acceleration data $\alpha_X$ and $\alpha_Y$, a request to utilize these instruction sets will be sent. The application program execution management unit 214 receiving this request sends an acquisition request for acceleration data as a data transfer instruction to the phone platform main control unit 215 (S5). The main control unit 215 receiving the request sends acceleration data $\alpha_X$ and $\alpha_Y$ memorized in the platform memory area in RAM 202 to the application program execution management unit 214, and the data are passed to the application program (S6). Then, the application program acquiring the acceleration data $\alpha_X$ and $\alpha_Y$ memorizes the data into the application memory area in RAM 202. Then, the moving distance and direction of the mobile phone 20 is calculated from the acceleration data $\alpha_X$ and $\alpha_Y$, and a process is performed to output information of the moving distance and direction to the notebook-size personal computer etc. from the external port (S7). In the present operation example 1, after the main control unit 215 receives the acquisition request for acceleration data from the application program execution management unit 214, whenever the acceleration $\alpha_X$ and $\alpha_Y$ in the platform execution management unit 214 are updated, the updated data are sent to the application execution management unit 214. Therefore, in almost real time, the mouse application program can acquire the acceleration data $\alpha_X$ and $\alpha_Y$ and output the information of the moving distance and direction to the notebook-size personal computer etc.

In the operation example 1 as described above, by the phone platform-independent application program that can be registered and used by users, a process can be performed using acceleration data $\alpha_X$ and $\alpha_Y$ acquired by the sensor detection unit 21 i controlled by the phone platform. Specifically, the mobile phone 20 can be used as a pointing device for portable personal computers etc. Generally, since such portable personal computers are miniaturized, the operationality of built-in pointing devices is inferior to desktop personal computers. Accordingly, some users often carry a so-called removable mouse with a portable personal computer. In the present operation example 1, the mobile phone 20 that typical users almost always carry can be utilized as a removable mouse. Therefore, it is not necessary to carry a removable mouse as conventional way to get the same operationality as desktop personal computers.

In the operation example 1, the mouse application program is explained as an example of application programs using the acceleration data $\alpha_X$ and $\alpha_Y$; however, the present invention is by no means intended to be limited to this example.

As for other application programs, for example, there is an application program to make the mobile phone 20 work as a pedometer (Trademark). In this case, the application program, for example, has a content by which acceleration data are acquired continuously in almost real time the same as above, and the times when the acceleration exceeds a certain threshold are counted. Also, if the acceleration data $\alpha_X$ and $\alpha_Y$ are used, movement such as walking, running or riding on trains by user 1 can be assumed from the acceleration change. It is possible to provide an application program to record the daily activity history of user 1 based on these assumptions. At this time, if the bearing angle data of $\theta_N$ is also utilized, the bearing to which user 1 is moving can be recognized, so that it is possible to record the daily activity history in more detail. The storage location of this activity history is not limited to inside the mobile phone 20 and the activity history may be saved to a predetermined server on a communication network from the data communication unit 212.

Moreover, as for other application programs, for example, there is an application program to make the mobile phone 20 may work as an alarm clock whose alarm can be stopped by giving an impact to the mobile phone 20. In this case, the application program, for example, stops the alarm if acceleration exceeds a certain value while beeping the alarm. According to this program, since users do not need to perform conventional button operations to stop the alarm, the convenience of users can be enhanced.

OPERATION EXAMPLE 2

Next, a process operation to execute an application program using the pitch angle $\theta_X$, the roll angle $\theta_Y$ and the yaw angle $\theta_Z$ (hereinafter referred to as "Operation example 2") will be described. The application program in the present operation example is a flight simulator game.

Figure 9:
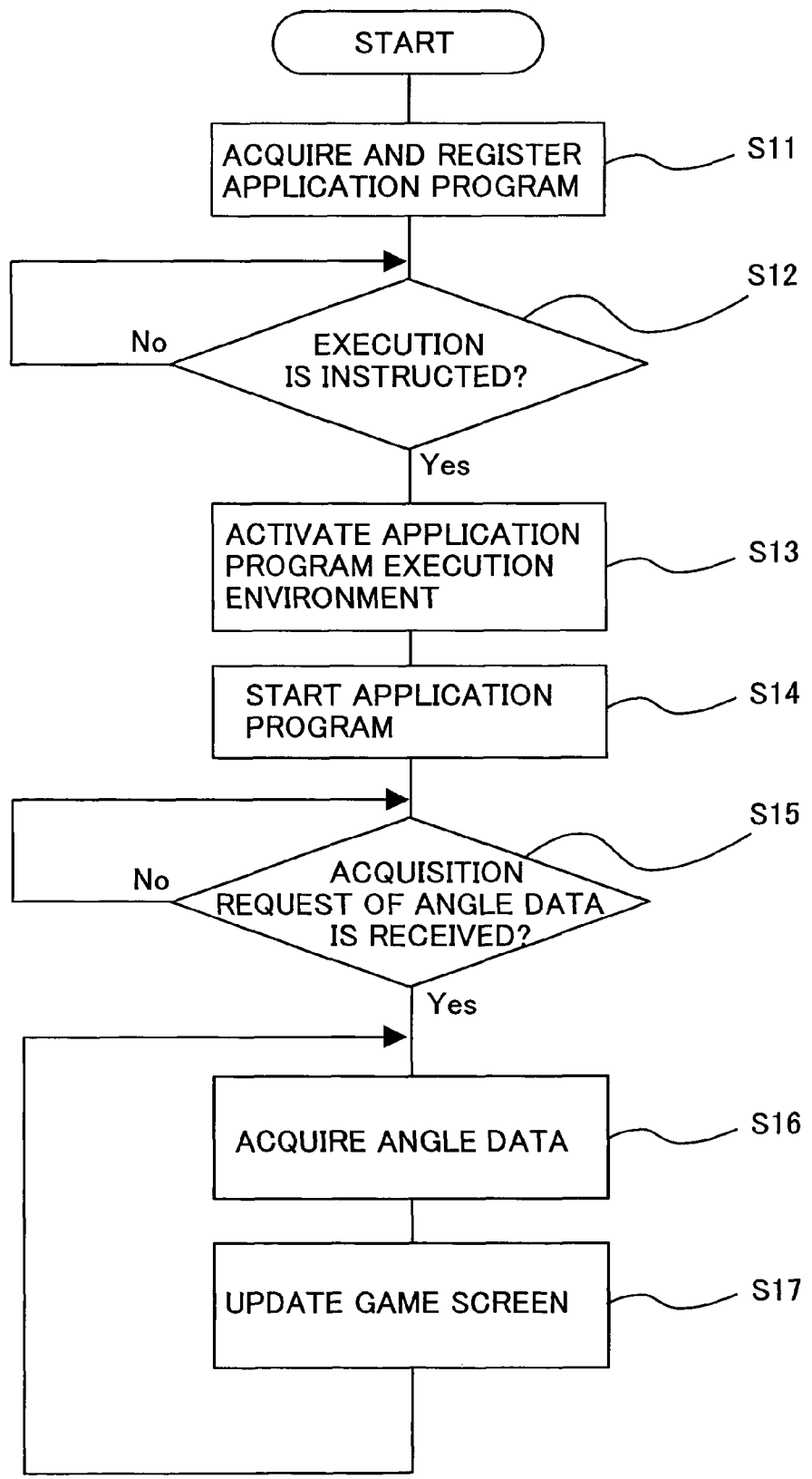
[FIG. 9] Flow chart showing the process flow to execute an application program in a mobile phone according to an operation example 2.

FIG. 9 is a flow chart showing process flow to execute an application program in the present operation example 2.

User 1 downloads and obtains a flight simulation program (application program) from the download server 11 and starts it (S11-S14) in the same way as in the above-described operation example 1. After this program is started, the output unit 216 displays a game screen illustrating a pseudo-view from an airplane cockpit on LCD27. This program acquires the pitch angle $\theta_X$, the roll angle $\theta_Y$ and the yaw angle $\theta_Z$ in almost real time. Then, the program updates the content of the game screen displayed on the LCD 27 in accordance with the acquired data. For example, when user 1 tilts down the antenna side of the mobile phone 20 vertically, the pitch angle $\theta_X$ changes by this action, so that the game screen is updated to display the airplane nose tilting down vertically in the game. And, for example, when user 1 tilts the mobile phone 20 left, the roll angle $\theta_Y$ changes by this action, so that the game screen is updated to display the airplane tilting left in the game.

Figure 10:
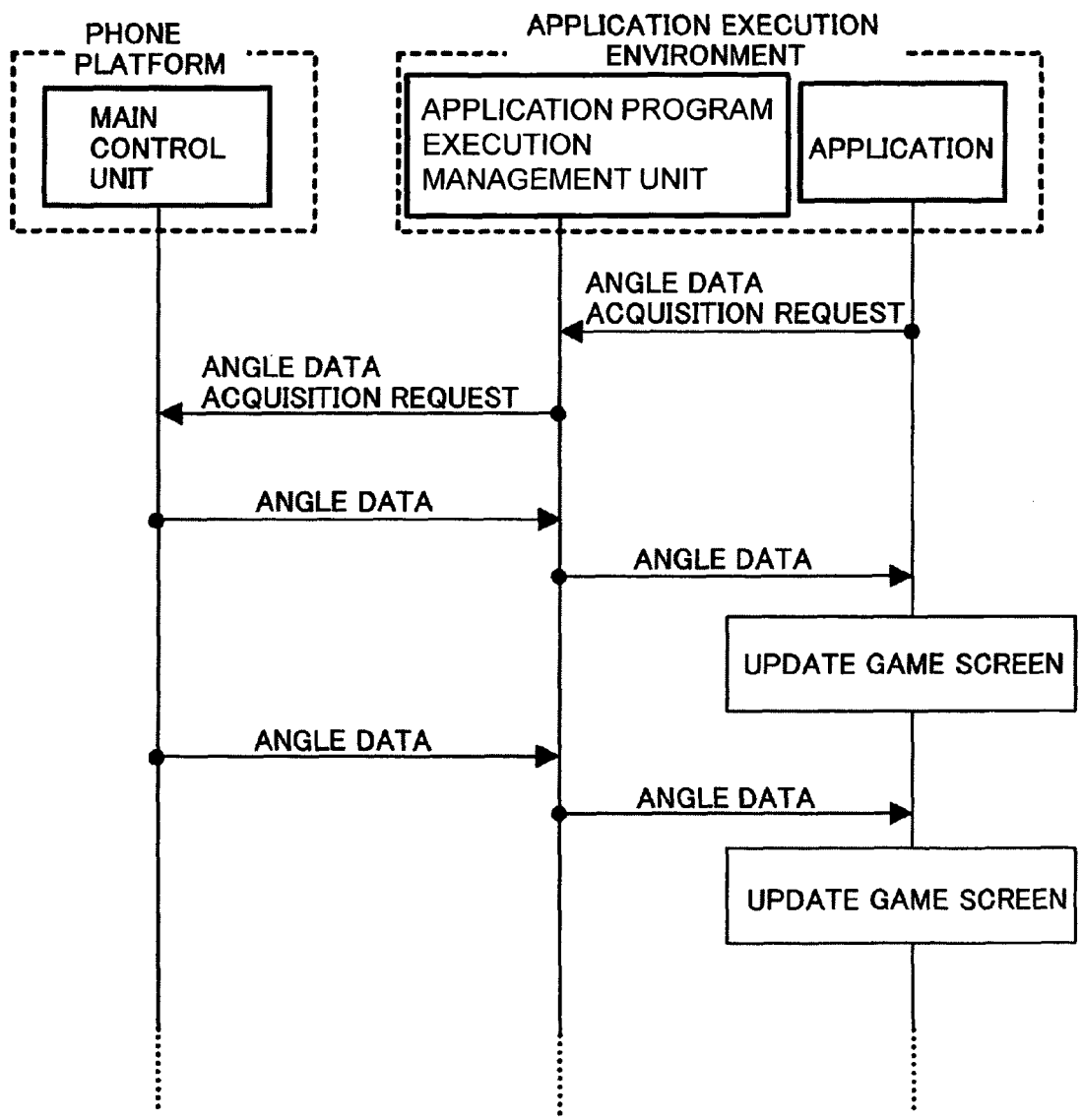
[FIG. 10] Sequence flow chart when executing an application program in the same mobile phone.

Specifically, as shown in FIG. 10, on the application execution environment, the started application program sends a request for acquiring the angle data to the application program execution management unit 214. In the present operation example 2, since the instruction sets of such as getPitch( ), getRoll( ) and getCompassBearing( ), etc. are defined as methods to get data of the pitch angle $\theta_X$, the roll angle $\theta_Y$ and the yaw angle $\theta_Z$, a request for utilizing the instruction set is sent out. The application program execution management unit 214 receiving this request sends a request for acquiring the angle data as a data transfer instruction to the phone platform main control unit 215. The main control unit 215 receiving this request sends the pitch angle $\theta_X$, the roll angle $\theta_Y$ and the yaw angle $\theta_Z$ data stored in the platform memory area in RAM 202 to the application program execution management unit 214, and these data are passed to the application program (S16). Then, the application program acquiring the data of pitch angle $\theta_X$, roll angle $\theta_Y$ and yaw angle $\theta_Z$ stores the data into the application memory area in RAM 202. Then, the game screen is updated based on the pitch angle $\theta_X$, the roll angle $\theta_Y$ and the yaw angle $\theta_Z$ and the process to display the updated game screen on the LCD 27 of the mobile phone 20 is executed (S17). In the present operation example 2, in the same way as in the operation example 1, after the main control unit 215 receives a request for acquiring the angle data from the application program execution management unit 214, whenever the angle $\theta_X$, $\theta_Y$ and $\theta_Z$ data are updated, the main control unit 215 sends the updated data to the application program execution management unit 214. Therefore, user 1 can enjoy the game in which airplane flight can be controlled by tilting the main body of the mobile phone 20 while viewing the LCD 27 of the mobile phone 20.

In the operation example 2 as described above, by the phone platform-independent application program which can be registered and used by users, a process can be performed using the angle data $\theta_X$, $\theta_Y$ and $\theta_Z$ acquired by the sensor detection unit 217 controlled by the phone platform. Specifically, by tilting the main body of the mobile phone 20, a game controlling airplane flight on a flight simulator can be provided. Although flight control of the airplane in the flight simulator may be possible by operating the operation unit 213 of the mobile phone 20, the present operation example provides more realistic flight control.

In the present operation example 2, the flight simulation program is explained as an example of application programs using the pitch angle $\theta_X$, the roll angle $\theta_Y$ and the yaw angle $\theta_Z$ data; however, the present invention is by no means intended to be limited to this example.

As for other application program, for example, a game in which a ball is dropped into a hole in the game screen to be displayed on the LCD 27 can be considered. In this case, the application program content, for example, is such that by tilting the mobile phone 20, the ball in the game screen moves in the tilted direction.

OPERATION EXAMPLE 3

Next, a process operation to execute a mouse application program using the acceleration $\alpha_X$ and $\alpha_Y$ (hereinafter referred to as "Operation example 3") will be described, in the same way as in the operation example 1.

The application program executed in the present operation example 3 is different from the phone platform-independent application program executed on the application execution environment as in the operation example 1, in that the application program executed in the present operation example 3 is a phone platform-dependent application program. The phone platform-dependent application program means that they work directly on the phone platform, in other words, they can be executed by the main control unit 215 functioning as application program execution means. Since basic operations in the present operation example 3 are the same as in the operation example 1, in the following section, different points is described mainly.

Figure 11:
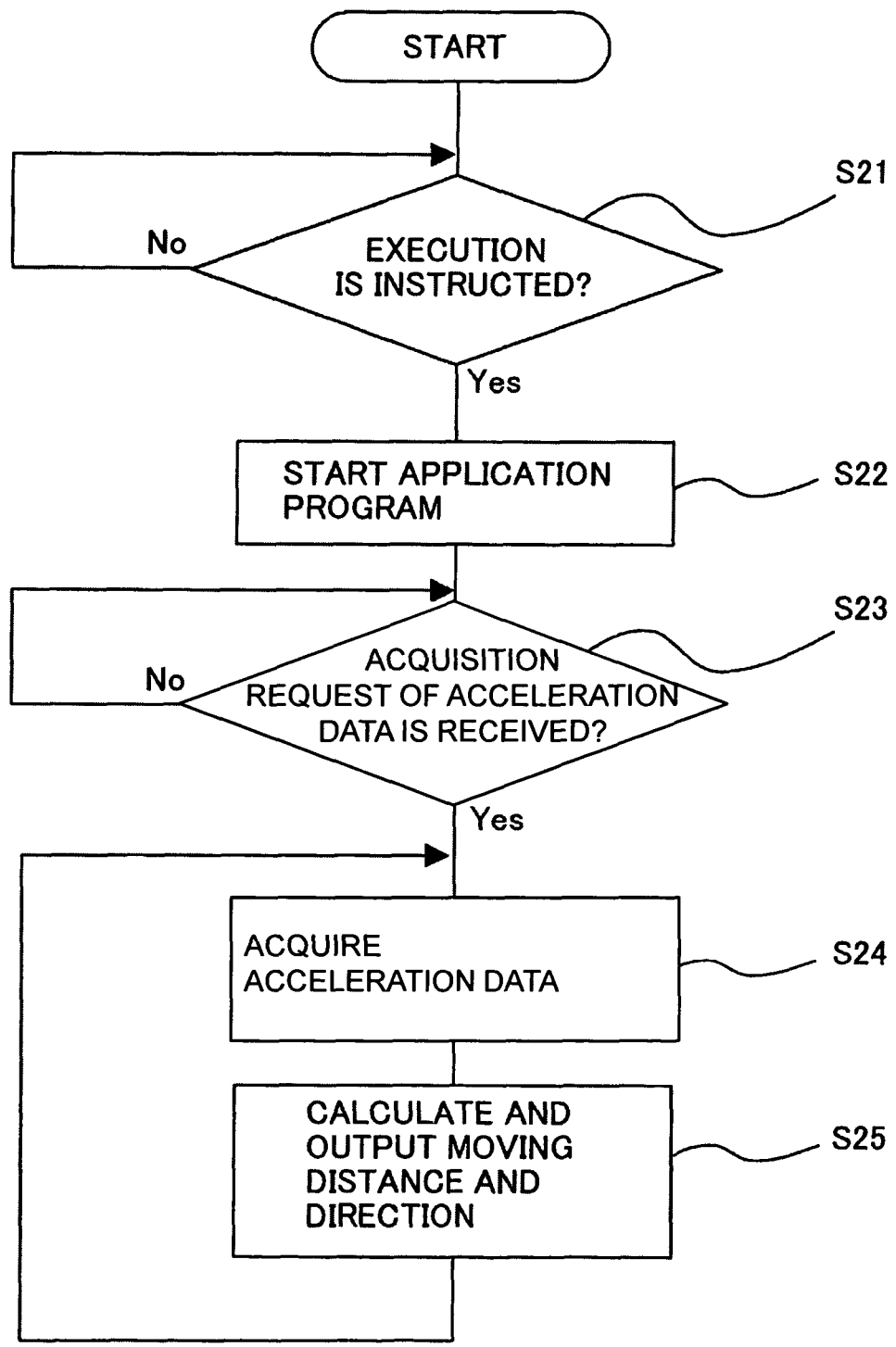
[FIG. 11] Flow chart showing the process flow to execute an application program in a mobile phone according to an operation example 3.

FIG. 11 is a flow chart to show a process flow to execute an application program in the present operation example 3.

The mouse application program subject to execute in the present operation example 3 is factory pre-stored in the ROM 203. Therefore, a process is not necessary to download an application program from the download server 11 to acquire and to register this before being executed as in the operation example 1. When executing the application program, first, user 1 connects the mobile phone 20 to a notebook-size personal computer etc. and then, select an application to be executed by the operating keys of the operation unit 213 in the same way as in the operation example 1. So an execution instruction of the application program is input into the phone platform shown in FIG. 6, i.e. the main control unit 215 shown in FIG. 5 (S21). Accordingly, the main control unit 215 reads out the mouse application program and starts it (S22). In the present operation example, it is not required to activate the application execution environment at this moment.

After starting the mouse application program, the application program acquires the acceleration data $\alpha_X$ and $\alpha_Y$ detected by the sensor detection unit 217 in almost real time. Then, the application program calculates the moving distance and direction of the mobile phone 20 based on the acquired data. This moving distance and direction continue to be output to a notebook-size personal computer etc. via the external ports of the mobile phone 20 at predetermined short intervals.

Figure 12:
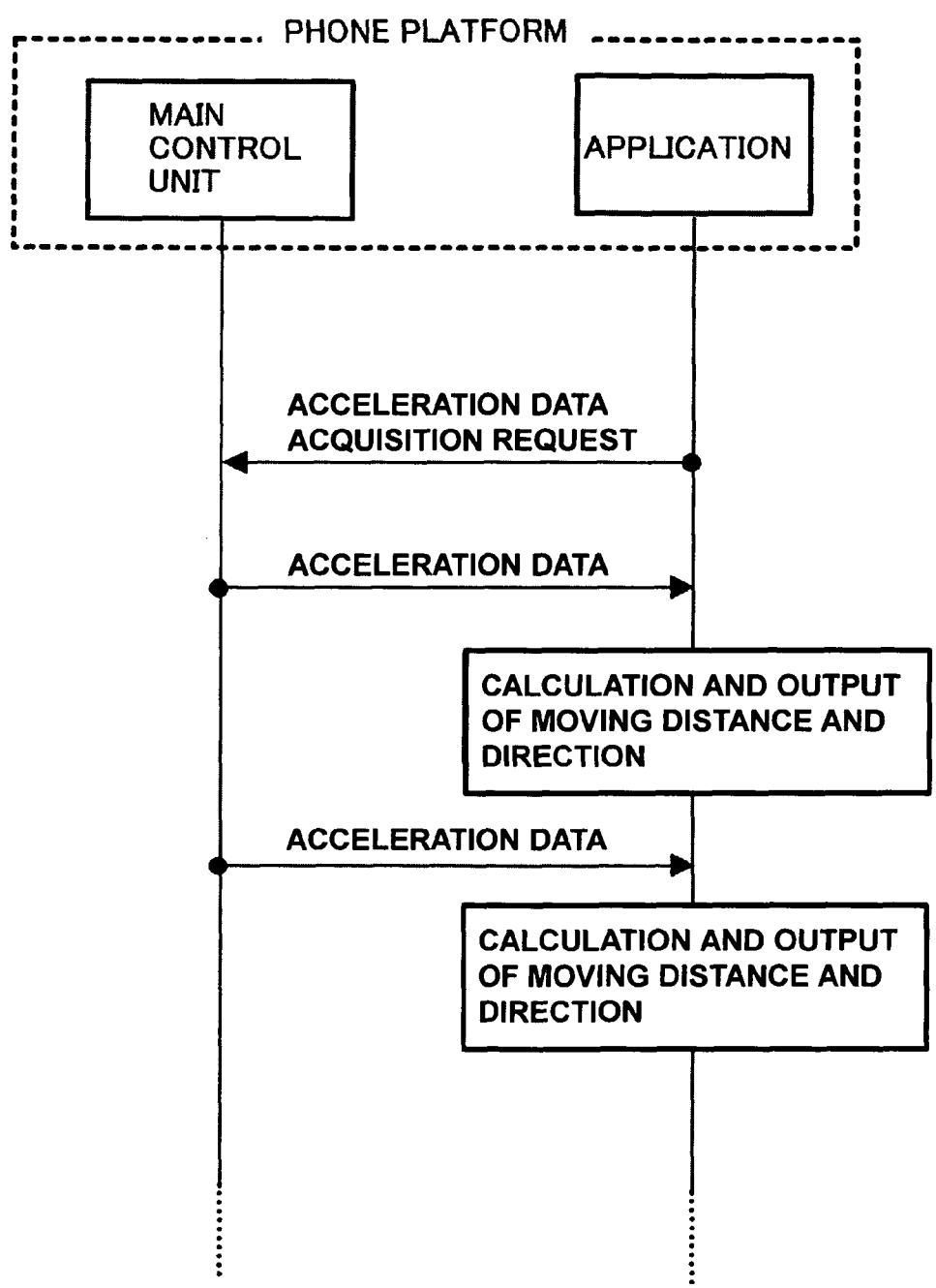
[FIG. 12] Sequence flow chart when executing an application program in the same mobile phone.

More specifically, as shown in FIG. 12, in the phone platform, the started application program sends a request for acquiring acceleration data to the main control unit 215 (S23).

The main control unit 215 receives and passes the acceleration data $\alpha_X$ and $\alpha_Y$ stored in the platform memory area in RAM 202 to the application program (S24). Then, the application program acquiring the acceleration data $\alpha_X$ and $\alpha_Y$ calculates the moving distance and direction of the mobile phone 20 from the data and executes a process to output the moving distance and direction information to notebook-size personal computers etc. (S25). In the present operation example 3, after the main control unit 215 receives a request for acquiring acceleration data from the application program, whenever the acceleration $\alpha_X$ and $\alpha_Y$ in the platform memory area are updated, the main control unit 215 sends the updated data to the application program. Therefore, the mouse application program can acquire the acceleration data ax and ay and output the moving distance and direction information to a notebook-size personal computer etc., in almost real time.

In the present operation example 3 as described above, in the same way as in the operation example 1, the mobile phone 20 can be utilized as a pointing device for portable personal computers etc.

An application program executed in the present operation example 3 is a phone platform-dependent one executed by the main control unit 215. Therefore, the present operation example 3 can be applied to mobile phones without the application program execution management unit 214.

Regarding other application programs using the acceleration $\alpha_X$ and $\alpha_Y$, the angles $\theta_X$, $\theta_Y$, and $\theta_Z$, and the bearing angle $\theta_N$, for example, an application program that makes the mobile phone 20 work as input means for changing various types of settings such as a manner mode set by position, direction, attitude and movement of the mobile phone 20 can be taken for example. In this case, the content of the application program, for example, is for setting the manner mode when the mobile phone 20 is in a standing state or setting the power saving mode when the mobile phone is in a static state.

In the present embodiment, the main control unit 215 works to send the updated data whenever the data in the platform memory area is updated after receiving the acquisition request via the application program execution management unit 214 or directly from the application; however, the operation can be modified appropriately in accordance with the content of the application program. For example, when an acquisition request is received, the main control unit may be to send the data in the platform memory area only once. In the operation example 1 and operation example 2, the application program execution management unit 214 may output an acquisition request without waiting for an instruction from the application program.

[Second Embodiment]

Next, the second embodiment of the present invention will be described.

Since configuration, operation, etc. of mobile communication systems capable of utilizing a mobile phone as a mobile communication terminal according to the present embodiment and the mobile phone can employ the same ones in the first embodiment, the description of the common parts will be omitted. In the following, the different parts from the configuration and operation in the first embodiment will be described.

The acceleration sensor 207 of the mobile phone in the present embodiment is a 2-axis acceleration sensor for detecting the acceleration $\alpha_X$ and $\alpha_Y$ going in the two directions (X-axis and Y-axis direction in FIG. 3) that are mutually perpendicular on a plain parallel to the plain installed data input keys. This acceleration sensor 207 is mounted on the circuit board (not shown) provided inside the mobile phone 20, and can be used a publicly known sensor capable of detecting the acceleration $\alpha_X$ and $\alpha_Y$.

This acceleration sensor 207 may be configured as a separate device from the main body of the mobile phone 20. In this case, for example, an external device including the acceleration sensor 207 is connected to the external ports provided on the main body of the mobile phone 20 so that the external device and the main body of the mobile phone 20 are configured to be incorporated.

The geomagnetic sensor 208 is a 3-axis geomagnetic sensor to detect the magnetic strength component (magnetic flux density component) of geomagnetism in a total of three directions, two directions which are mutually-perpendicular in the plain parallel to the plain where data input keys are installed (X-axis and Y-axis direction in foregoing FIG. 3) and one direction (Z-axis direction) which is perpendicular to those two directions, and to output the geomagnetic component data in three directions. From this geomagnetic component data, data (the pitch angle $\theta_X$, the roll angle $\theta_Y$, and the yaw angle $\theta_Z$) regarding the mobile phone attitude can be calculated. The pitch angle $\theta_X$, the roll angle $\theta_Y$, and the yaw angle $\theta_Z$ are the angle around the X-axis, the angle around the Y-axis and the angle of the Z-axis against the standard attitude decided by the direction of geomagnetism respectively.

In the present embodiment, the main control unit 215 in a block diagram shown in FIG. 5 is used as data process means and radio wave strength confirmation means.

This main control unit 215 controls the phone communication unit 211, data communication unit 212, operation unit 213 and sensor detection unit 217, and is comprised of a system bus 200, a CPU 201 and a RAM 202, etc. This main control unit 215 exchanges control instructions and various kinds of data with an application program execution management unit 214 and works with them for control. Also, the main control unit 215 works as radio wave strength confirmation means for confirming the strength of radio waves utilized by the phone communication unit 211. The main control unit 215 corresponds to the lowest part of "Phone Platform" in software configuration of FIG. 6 and executes a control program to control the phone communication unit 211 etc. and user interface, and provides phone platform libraries. This phone platform can perform various types of processes in the application program, and call and use the application control software in the application execution environment via the application control API, by sending an event to the execution environment control libraries in the application execution environment. Also, when the application execution environment calls and uses the phone platform libraries via the phone platform API, the phone platform performs a process in accordance with the phone platform libraries. For example, the phone platform can read out data stored in the platform memory area controlled by the phone platform in RAM 202 based on an instruction from the application execution environment utilizing the phone platform libraries, and transfer this data to the application memory area.

The sensor detection unit 217 is comprised of the foregoing acceleration sensor 207 and geomagnetic sensor 208 etc. The sensor detection unit 217 works under the control of the main control unit 215 and the detection data is acquired by the main control unit 215. The detection data, acceleration $\alpha_X$ and $\alpha_Y$ and geomagnetic component data are stored in the platform memory area in RAM 202, as described above. For example, when the position of mobile phone 20 is changed by user 1, the accelerations working in the X-axis and Y-axis directions is detected by the acceleration sensor 207 forming the sensor detection unit 217. When the detection data is input into the main control unit 215, the main control unit 215 can understand X-axis acceleration $\alpha_X$ and Y-axis acceleration $\alpha_Y$ from the detection data. This acceleration data $\alpha_X$ and $\alpha_Y$ are stored temporarily in the platform memory area in RAM 202 by the main control unit 215. Then, a hereinafter described data process is performed on the acceleration data $\alpha_X$ and $\alpha_Y$ and stored in the platform memory area by the main control unit 215 functioning as data process means, and the process results are stored in the application memory area. Also, when the attitude of the mobile phone 20 is changed, the geomagnetic strength component (magnetic flux density component) after changing the attitude is detected by the geomagnetic sensor 207 forming the sensor detection unit 217. The sensor detection unit 217 outputs the three directional geomagnetic component data detected by the geomagnetic sensor 207 to the main control unit 215. Therefore, the main control unit 215 can calculate the pitch angle, the roll angle and the yaw angle after changing the attitude from the three directional geomagnetic component input data. The calculated data of each angle are stored in the platform memory area in RAM 202, in the same way as for acceleration $\alpha_X$ and $\alpha_Y$. This calculation of pitch angle, roll angle and yaw angle is not necessarily performed in the main control unit 215, and may be performed in the sensor detection unit 217 or the application program execution management unit 214. For example, when using the application program executed on the application execution environment, after calling up, the application program execution management unit 214 may perform the calculation by calling a class library for calculation in accordance with the application program.

Methods in which the main control unit 215 acquires the acceleration data such as $\alpha_X$ and $\alpha_Y$ to be stored in the platform memory area from the sensor detection unit 217 are as follows. For example, there is an acquiring method in which the main control unit 215 sends a request to the sensor detection unit 217 and receives data output from the sensor detection unit 217 in accordance with the request. And, for example, an acquiring method may be employed, in which the main control unit 215 continues to accordingly receive data output from the sensor detection unit 217 without any request. Also, an acquiring method may be employed, in which the main control unit 215 sends a request to the sensor detection unit 217 in accordance with a request output from an application program via application program execution management unit 214, and the main control unit 215 receives data output from the sensor detection unit 217 in accordance with the request.

Next, a process operation to execute an application program utilizing the acceleration $\alpha_X$ and $\alpha_Y$ detection data will be described. In the present embodiment, a case of an application program functioning a mobile phone as a pedometer using the acceleration $\alpha_X$ and $\alpha_Y$ will be described.

Figure 13:
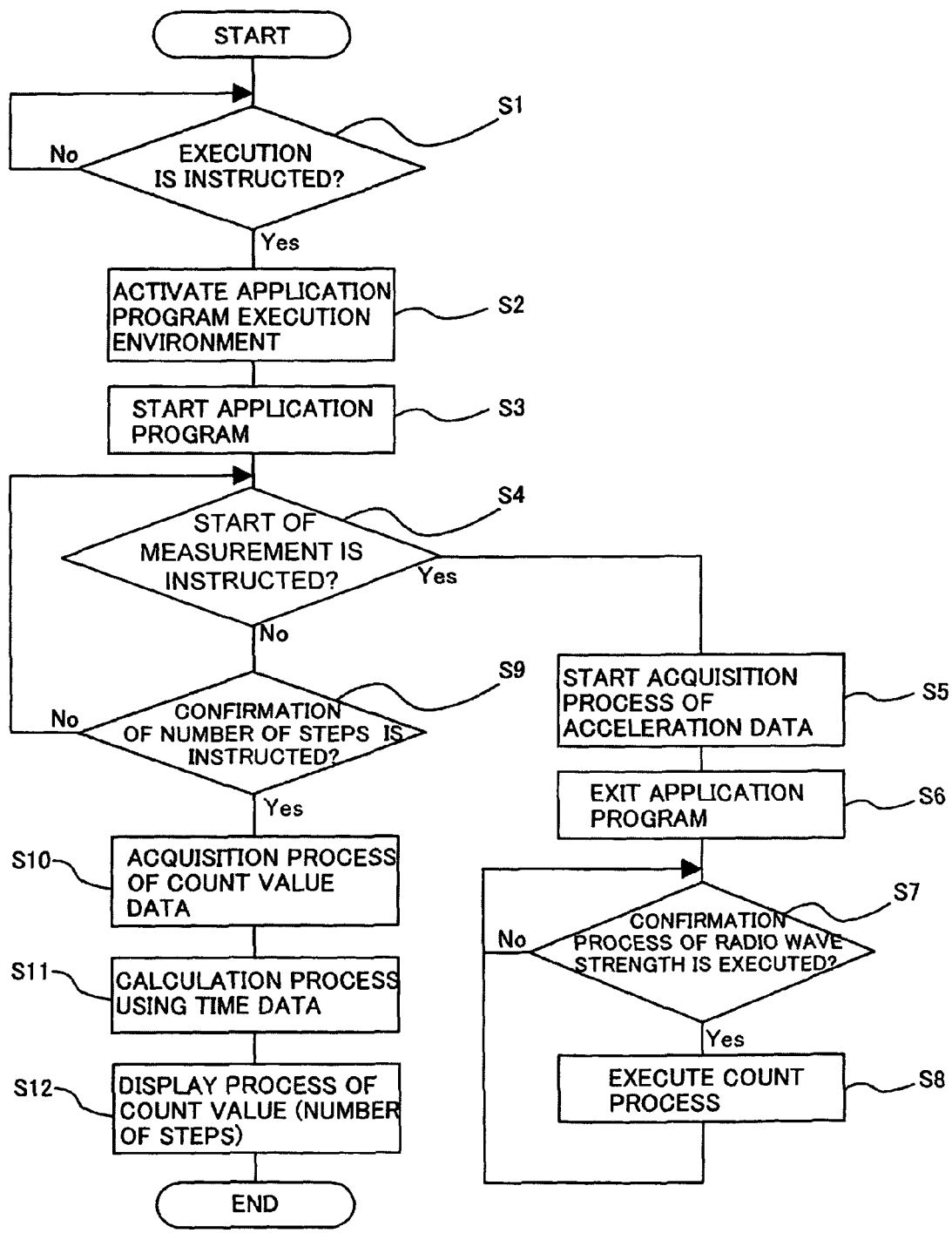
[FIG. 13] Flow chart showing the process flow to execute an application program in a mobile phone according to the second embodiment.

FIG. 13 is a flow chart showing the process flow to execute an application program in the present embodiment.

First, user 1 acquires a pedometer application program from the download server 11 and registers it. Specifically, user 1 operates keys in the operation unit 213 and has access to the download server 11. Then, a download selection screen is displayed on the liquid crystal display 27 to select a downloadable application program. On the download selection screen, when the user selects a pedometer application program subject to be executed by using the scroll key 24 and presses the multifunction key 25, the main control unit 215 controls the data communication unit 212 and downloads the application program from the download server 11. In this way, the downloaded application program is stored in RAM 102 by the main control unit 215.

When executing the downloaded application program, user 1 operates keys in the operation unit 213 and displays the application selection screen on the liquid crystal display 27 to select an application program to be executed. On the application selection screen, the user selects a pedometer application program subject to be executed by using the scroll key 24 and presses the multifunction key 25. Then, an instruction for executing the application program is input into the phone platform shown in foregoing FIG. 6, i.e. the main control unit 215 shown in FIG. 5 (S1). Accordingly, the main control unit 215 activates the application execution environment shown in FIG. 6, i.e. the application program execution management unit 214 shown in FIG. 5 (S2). The application program execution management unit 214 reads out the pedometer application program and starts it (S3).

After starting the pedometer application program, first, user 1 operates keys in the operation unit 213 to start the measurement of the pedometer (S4). Then, on the application execution environment, the application program sends an instruction for starting the measurement to the application program execution management unit 214. The application program execution management unit 214 receiving the instruction sends an instruction for starting the measurement to the phone platform main control unit 215. The main control unit 215 receiving the instruction starts a process to acquire the acceleration data $\alpha_X$ and $\alpha_Y$ (detection data) detected by the sensor detection unit 215 (S5), and stores the data in the platform memory area in RAM 202 temporarily. Then, the main control unit 215 exits the application program (S6). Thereafter, the main control unit 215 works as data process means and performs a calculation process for counting data exceeding an predetermined threshold among the combined acceleration data $\alpha_X$ and $\alpha_Y$ stored in the platform memory area in accordance with a predetermined arithmetic expression (S8), whenever a process for confirming the strength of radio waves utilized by the phone communication unit 211 (S7). This counted value data (calculation result data) is stored one by one in the platform memory area in RAM 202, in the state of being related to time data (other data) at the time of the calculation process. Therefore, whenever the process for confirming the radio wave strength is performed, the count value data from the previous confirmation process to the current confirmation process is added one by one into the platform memory area, in the state of being related to the time data. The threshold is appropriately determined based on the strength of acceleration that is assumed to be applied to the mobile phone 20 when user 1 walks. Accordingly, the count value data is equivalent to the number of steps taken by the user walking.

In the present embodiment, it is described the case for performing a calculation process whenever process for confirming the strength of radio waves is performed; however, the calculation process may be performed with some other timing. For example, the calculation process and the storage process may be performed every time a predetermined time is passed, or the calculation process and the storage process may be performed whenever the number of acceleration data stored in the platform memory area reaches a predetermined number.

Furthermore, in the present embodiment, the count value data are stored by being associated with the time data indicating the time of the calculation process; however, other time indicators may be used for the time data. For example, if a configuration to store each acceleration data in the state of being associated with each detection time has been employed, time data associated with the one detected at latest time among the acceleration data exceeding the threshold in the calculation process may be used.

Figure 14:
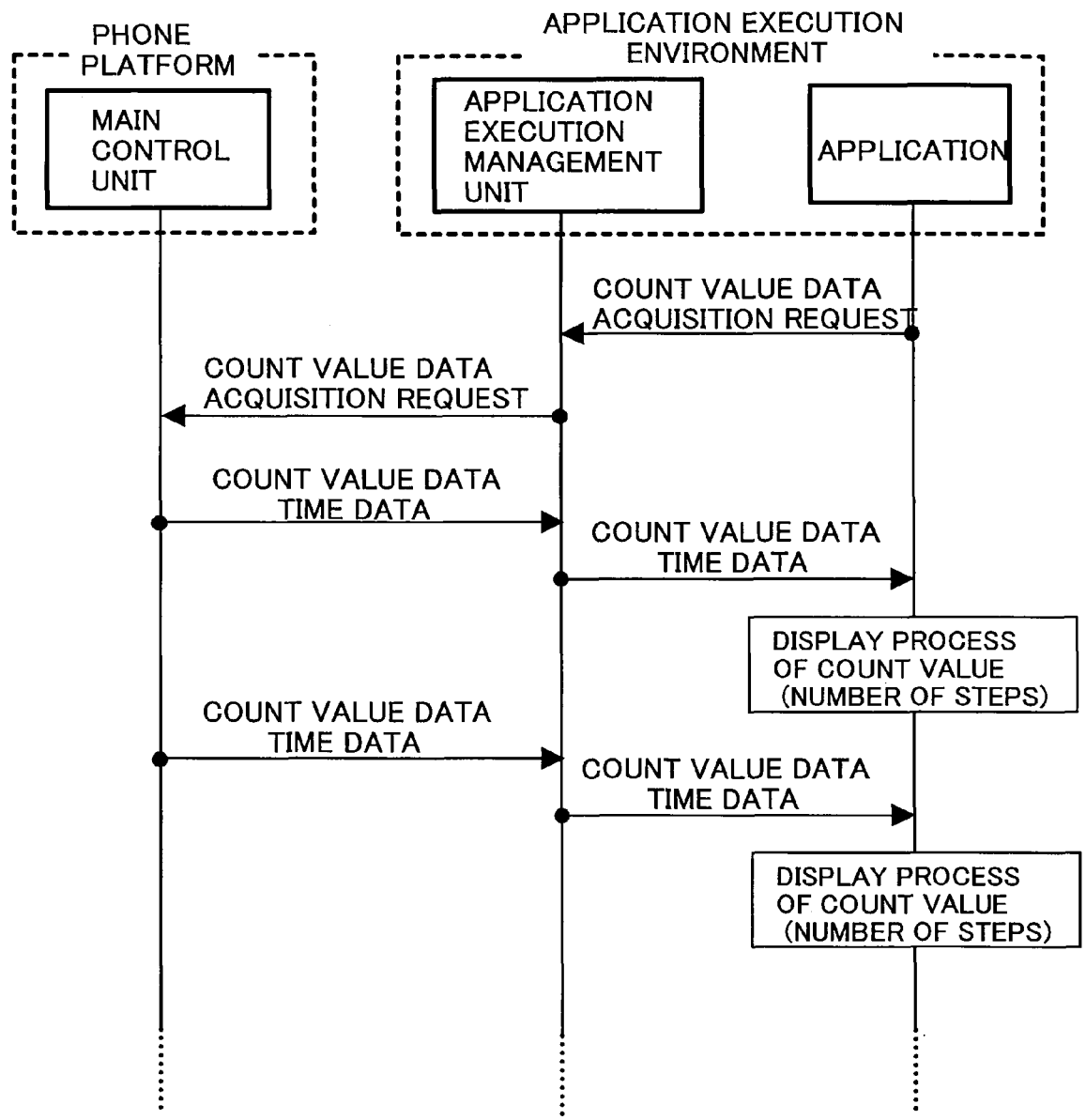
[FIG. 14] Sequence flow chart when executing an application program in the same mobile phone.

On the other hand, when confirming the current number of steps after starting the pedometer in this way, the user again starts the pedometer application program (S1-S3). Then, to display a steps number confirmation window for confirming the count number of the pedometer on the liquid crystal display 27, keys on the operation unit 213 are operated (S9). Then, as shown in FIG. 14, on the application execution environment, the application program sends a request for acquiring the count value data to the application program execution management unit 214. The application program execution management unit 214 receiving this request sends a request for acquiring the count value data to the main control unit 215 of the phone platform. The main control unit 215 receiving this request sends the count value data and time data stored in the platform memory area in RAM 202 to the application program execution management unit 214 and these data are passed to the application program. The application program acquiring the count value data and time data stores these data into the application memory area in RAM 202 (S10). At this time, usually, there are a number of combinations of the count value data and the time data for each time (at process timing for confirming the radio wave strength). Therefore, in accordance with the description of the application program, the application program execution management unit 214 accordingly performs the calculation and sort-out process for many count value data based on each time data (S11), and displays the count value (number of steps) indicated by the count value data on the liquid crystal display 27 (S12). For example, in the case of displaying the number of steps taken by user 1 walking from 9 a.m. to 10 a.m., the total accumulated count value data which has time data from 9 a.m. to 10 a.m. is displayed on the liquid crystal display 27 as the number of steps taken by user 1 walking from 9 a.m. to 10 a.m. By performing this kind of display, when getting home, user 1 can confirm the number of steps during each timeframe for the day.

For example, in the case in which only the number of steps taken by user 1 walking from 9 a.m. to 10 a.m. is displayed at noon, it is not necessary to calculate count value data for the number of steps taken by user 1 walking from 10 a.m. to noon. Therefore, in this case, the application program may send a request for acquiring count value data from only 9 a.m. to 10 a.m. Accordingly, the main control unit 215 specifies count value data and time data which have met predetermined conditions associated with time data from 9 a.m. to 10 a.m. among count value data and time data stored in the platform memory area in RAM 202, and passes only the specified data to the application program. By doing like this, the application program is not required to specify count value data associated with time data from 9 a.m. to 10 a.m. Therefore, the content of the application program can be simplified and such application programs can be developed easily.

Furthermore, after receiving a request for acquiring count value data, until the application program exits, periodically or whenever count value data is added, the main control unit 215 may work to send the added count value data to the application program execution management unit 214. In this case, if a user activates the application program continuously, the number of steps can be confirmed in real time.

In the present embodiment as described above, the mobile phone 20 can be utilized as a pedometer capable of confirming the history of the number of steps during each timeframe. And, a process for calculating count value data (calculation result data) from acceleration data (detection data) and a process for associating the count value data with time data (other data) are performed on the main control unit side, so that it is not necessary to perform these processes on the application program side. Accordingly, the program content related to these processes can be omitted, so that pedometer application program contents such as the present embodiment can be simplified. Furthermore, as described above, in the present embodiment, the number of steps can be measured even though the pedometer application program has not been started. Therefore, power consumption can be reduced compared to the case of measuring the number of steps in the state of continuously executing the application program. Moreover, in the present embodiment, the count process for counting the number of steps from the acceleration data detected by the sensor detection unit 217 is performed when performing the radio wave strength confirmation process. When performing this radio wave strength confirmation process, even if in the state in which there is no power to the main control unit 215, for example, in the power saving mode, the power is supplied to the main control unit 215 to perform the process. Therefore, in the present embodiment, if the count process is performed when performing this confirmation process, the reduction effect of power consumption can be improved further.

In the present embodiment, although employing a configuration of associating the count value data (calculation result data) with time data (other data) and storing the data, it may be configured so as to associate each acceleration data (detection data) with each time data (other data) and to store them. In this case, a process for calculating the count value data is performed on the application program side; however, a process for associating the acceleration data with the detection time data is performed on the main control unit side, so that the program content can be simplified for that part.

Furthermore, in the present embodiment, an application program using the acceleration data $\alpha_X$ and $\alpha_Y$ and time data is described with an example of a pedometer application program; however, the present invention is by no means intended to be limited to this example.

For other application programs, for example, an application program can be considered, which specifies the time when user 1 is on a train by using the change of acceleration data $\alpha_X$ and $\alpha_Y$ (detection data) acquired from the detection results of the detection sensor 207 and the timeframe of the change, and to automatically switch the mobile phone mode to the manner mode setup. It is difficult to determine accurately whether user 1 is on the train only by the change of acceleration data $\alpha_X$ and $\alpha_Y$. However, if the possible timeframe for user 1 to be on a train is known in advance and registered, by observing the change of acceleration data $\alpha_X$ and $\alpha_Y$ in the timeframe, the accuracy of the determination as to whether user 1 is on the train or not can be improved.

Furthermore, in the present embodiment, an application program utilizing the acceleration data $\alpha_X$ and $\alpha_Y$ is described; however, application programs utilizing other data are possible. For example, it is possible for an application program to utilize the pitch angle, the roll angle and the yaw angle data calculated from three-directional geomagnetic component output data (detection data) from the geomagnetic sensor 208 instead of the acceleration data or in addition to the acceleration data.

Table 1 shows an example of data format of acceleration (x-axis and y-axis) and three-directional geomagnetic component stored in the application memory area in data format (table format) specified by the application program so that the data format is easy to use for the application program. In this example, detection data of three-directional geomagnetic components indicating attitude of the mobile phone is calculated with an arithmetic expression "a" and converted, in accordance with a designation by the application program. And, detection data of acceleration indicating movement of the mobile phone is calculated with an arithmetic expression "b" and converted. The calculation process using these expressions "a" and "b" is a data process designated by the application program. Moreover, by associating these calculation result data after calculation with the mobile phone location information data acquired at same time, a pair of data set is generated. This association is also a data process designated by the application program. This data set can be generated and stored for any time. In the present embodiment, multiple pairs of data set meeting predetermined conditions (in the Table 1 example, data measured by one hour) specified by the application program are stored together in the application memory area.

When storing data such as in Table 1, an acquiring process of detection data, a calculation process using arithmetic expressions "a" and "b", a generation process of data set by associating with the location information and a generation process of data group with table format specified to meet predetermined conditions are all executed in the main control unit side as well. Then, these data are stored in the application memory area with data format in the Table 1, which is easy for the application program to use.

TABLE 1

| | X-axis component of geomagnetism (Expression a) | Y-axis component of geomagnetism (Expression a) | Z-axis component of geomagnetism (Expression a) | X-axis acceleration (Expression b) | Y-axis acceleration (Expression b) | Location information α |
|---|---|---|---|---|---|---|
| 2003.10.20 A.M. 06:00 | *** | *** | *** | *** | *** | *** |
| 2003.10.20 A.M. 07:00 | *** | *** | *** | *** | *** | *** |
| 2003.10.20 A.M. 08:00 | *** | *** | *** | *** | *** | *** |

As described above, preferred embodiments of the present invention are described; however, without departing from the scope or spirit of the present invention and within the scope of technical matters described in the scope of claims, various modifications can be added to the disclosed embodiments.

For example, the present invention can be applied not only to the mobile phones, but also mobile communication terminals such as PHS, automobile phones, portable PDA, etc. as long as they can execute application programs, by which the same effect can be obtained.

The invention claimed is:

1. A mobile communication terminal, comprising:
first memory means and second memory means for storing data;
an operating system arranged to access data stored in said first memory means;
an application execution environment that is executed on said operating system and that executes a platform-independent application, said platform-independent application having access to data stored in said second memory means and not having access to data stored in said first memory means;
detection means for detecting at least one of: position, direction, attitude and movement of the mobile communication terminal along at least one axis of a coordinate system, the detection means being controlled using the operating system;
memory process means for performing a memory process to store detection result data acquired based on detection results by said detection means in said first memory means, wherein the detection result data includes information concerning changes to the at least one of: position, direction, attitude and movement of the mobile communication terminal along the at least one axis; and
data transfer means for transferring the detection result data stored in said first memory means to said second memory means, according to a data transfer instruction from said application execution environment, wherein the data transfer instruction comprises:
a data acquisition request transmitted by said platform-independent application to said operating system via said application execution environment, said data acquisition request requesting detection result data stored in said first memory means;
a data message transmitted by said operating system to said platform-independent application, in response to receiving said data acquisition request, via said application execution environment, said data message including the detection result data, wherein said platform-independent application stores the detection result data in said second memory means; and
wherein said application execution environment executes said platform-independent application using the detection result data stored in said second memory means.

2. A mobile communication terminal according to claim 1, wherein said application execution environment has an instruction set for generating said data transfer instruction according to description in said platform-independent application.

3. A non-transitory computer readable medium storing an application program, the application program characterized in that a computer in said mobile communication terminal according to claim 2 works so that the application execution environment generates said data transfer instruction using said instruction set, by being executed by said application execution environment.

4. The mobile communication terminal according to claim 1, wherein said detection means includes angle detection means for detecting an angle against the standard angle around a virtual axis leading to a specified direction.

5. The mobile communication terminal according to claim 1, wherein said detection means includes acceleration detection means for detecting acceleration toward a specified direction working on said mobile communication terminal.

6. A mobile communication terminal according to claim 1, wherein the data transfer instruction further comprises one or more subsequent data messages transmitted to said platform-independent application each time the detection result data is updated in said first memory means.

7. A mobile communication terminal according to claim 1, wherein the application execution environment comprises:
one or more class libraries configured to be accessed by said platform-independent application to perform functions of said application execution environment via a corresponding class library application interface; and
one or more execution environment libraries configured to be accessed by said operating system and utilized by said operating system;
wherein the data acquisition request is transmitted through one or more class libraries and the data message is transmitted through one or more execution environment management libraries.

8. A mobile communication terminal according to claim 7, wherein the one or more class libraries comprise an orientation class library configured to receive the data acquisition request from said platform-independent application and transmit the data message received from the operating system to said platform-independent application.

9. A mobile communication terminal, comprising:
a first memory and a second memory for storing data;
an operating system arranged to access data stored in said first memory;
an application execution environment that is executed on said operating system and that executes a platform-independent application, said platform-independent application having access to data stored in said second memory and not having access to data stored in said first memory;
a 3-axis magnetic sensor and a 2-axis acceleration sensor used as sensors for detecting at least one of position, direction, attitude and movement of the mobile communication terminal in connection with at least one axis of a coordinate system in accordance with a detection instruction generated by said application execution environment according to a description of said platform-independent application, the sensors being controlled using the operating system; and
a memory processor that stores detection result data acquired based on detection results by said sensors in said first memory, wherein the detection results include information concerning changes to the at least one of position, direction, attitude and movement of the mobile communication terminal in connection with the at least one axis; and
a data transfer device that transfers the detection result data stored in the first memory to the second memory according to a data transfer instruction from the application execution environment, wherein the data transfer instruction comprises:
a data acquisition request transmitted by said platform-independent application to said operating system via said application execution environment, said data acquisition request requesting detection result data stored in said first memory;
a data message transmitted by said operating system to said platform-independent application, in response to receiving said data acquisition request, via said application execution environment, said data message including the detection result data, wherein said platform-independent application stores the detection result data in said second memory; and
wherein said application execution environment executes said platform-independent application using the detection result data stored in said second memory.

10. A mobile communication terminal, comprising:
an operating system arranged to access data stored in a first memory;
an application execution environment that is executed on said operating system and that executes a platform-independent application, said platform-independent application having access to data stored in a second memory and not having access to data stored in said first memory;
a detection device that detects at least one of position, direction, attitude and movement of said mobile communication terminal in connection with at least one axis of a coordinate system, the detection device being controlled using the operating system; and
a data processor that performs a data process of assigning the detection data of said detection device to predetermined arithmetic expression for calculation and storing the calculation result data in said first memory, wherein the detection data includes information concerning changes to the at least one of position, direction, attitude and movement of the mobile communication terminal in connection with the at least one axis; and
a data transfer device that transfers the calculation result data stored in the first memory to the second memory according to a data transfer instruction from the application execution environment, wherein the data transfer instruction comprises:
a data acquisition request transmitted by said platform-independent application to said operating system via said application execution environment, said data acquisition request requesting calculation result data stored in said first memory;
a data message transmitted by said operating system to said platform-independent application, in response to receiving said data acquisition request, via said application execution environment, said data message including the calculation result data, wherein said platform-independent application stores the calculation result data in said second memory; and
wherein said application execution environment executes the platform-independent application using the calculation result data stored in said second memory.

11. A mobile communication terminal, comprising:
an operating system arranged to access data stored in a first memory;
an application execution environment that is executed on said operating system and that executes a platform-independent application, said platform-independent application having access to data stored in a second memory and not having access to data stored in said first memory;
a detection device that detects at least one of position, direction, attitude and movement of said mobile communication terminal in connection with at least one axis of a coordinate system, the detection device being controlled using the operating system; and
a data processor that performs data processes of linking mutually between detection data of said detection device or data calculated from this detection data and other data acquired by other than said detection device, and storing the linked data in said first memory, wherein the detection data includes information concerning changes to the at least one of position, direction, attitude and movement of the mobile communication terminal in connection with the at least one axis; and
a data transfer device that transfers the linked data stored in the first memory to the second memory according to a data transfer instruction from the application execution environment, wherein the data transfer instruction comprises:
  a data acquisition request transmitted by said platform-independent application to said operating system via said application execution environment, said data acquisition request requesting the linked data stored in said first memory;
  a data message transmitted by said operating system to said platform-independent application, in response to receiving said data acquisition request, via said application execution environment, said data message including the linked data, wherein said platform-independent application stores the linked data in said second memory; and
wherein said application execution environment executes the platform-independent application using said linked data stored in said second memory.

12. A mobile communication terminal, comprising:
an operating system arranged to access data stored in a first memory;
an application execution environment that is executed on said operating system and that executes a platform-independent application, said platform-independent application having access to data stored in a second memory and not having access to data stored in said first memory;
a detection device that detects at least one of position, direction, attitude and movement of said mobile communication terminal in connection with at least one axis of a coordinate system, the detection device being controlled using the operating system; and
a data processor that performs a data process of specifying at least one of: detection data of said detection device or data calculated from the detection data, which meet predetermined conditions, and storing the specified data in said first memory, wherein the detection data includes information concerning changes to the at least one of: position, direction, attitude and movement of the mobile communication terminal in connection with the at least one axis; and
  a data transfer device that transfers the specified data stored in the first memory to the second memory according to a data transfer instruction from the application execution environment, wherein the data transfer instruction comprises:
    a data acquisition request transmitted by said platform-independent application to said operating system via said application execution environment, said data acquisition request requesting the specified data stored in said first memory;
    a data message transmitted by said operating system to said platform- independent application, in response to receiving said data acquisition request, via said application execution environment, said data message including the specified data, wherein said platform-independent application stores the specified data in said second memory; and
wherein said application execution environment executes the platform-independent application using said specified data stored in said second memory.

13. A mobile communication terminal according to claim 10, 11 or 12, further comprising:
a radio communication device that communicates by wireless communication utilizing radio waves; and
a radio wave strength confirmation device that confirms strength of the radio waves utilized by said radio communication device at specified time intervals;
wherein said data processor is used as at least one part of said radio wave strength confirmation device and performs said data process when confirming radio wave strength.

14. A mobile communication terminal according to claim 9, 10, 11, or 12 wherein said detection device includes an angle detection device that detects an angle against the standard angle around a virtual axis leading to a specified direction.

15. A mobile communication terminal according to claim 9, 10, 11, or 12, wherein said detection device includes an acceleration detection device that detects acceleration toward a specified direction working on said mobile communication terminal.

16. A mobile communication terminal, comprising:
a first memory and a second memory for storing data;
an operating system arranged to access data stored in the first memory;
an application execution environment that is executed on the operating system and that executes a platform-independent application, data stored in the second memory and not having access to data stored in said first memory;
at least one sensor that detects at least one of position, direction, attitude and movement of the mobile communication terminal along at least one axis of a coordinate system, the at least one sensor being controlled using the operating system;
a memory processor that performs a memory process to store, in the first memory, detection result data determined based on detection results by the at least one sensor, wherein the detection result data includes information concerning changes to the at least one of position, direction, attitude and movement of the mobile communication terminal in connection with the at least one axis; and
a data transfer device that transfers the detection result data stored in the first memory to the second memory, according to a data transfer instruction from the application execution environment, wherein the data transfer instruction comprises:
  a data acquisition request transmitted by said platform-independent application to said operating system via said application execution environment, said data acquisition request requesting detection result data stored in said first memory;
  a data message transmitted by said operating system to said platform-independent application, in response to receiving said data acquisition request, via said application execution environment, said data message including the detection result data, wherein said platform-independent application stores the detection result data in said second memory; and
wherein the application execution environment executes the platform-independent application using the detection result data stored in the second memory.

17. The mobile communication terminal according to claim 16, wherein the application execution environment is executed using a processor that is the same as the memory processor.

18. The mobile communication terminal according to claim 16, wherein the first memory and the second memory are different memory locations on a memory device.

19. The mobile communication terminal according to claim 16, wherein the at least one sensor includes at least one of: a magnetic sensor and an acceleration sensor.

20. The mobile communication terminal according to claim 19, wherein the at least one sensor includes a geomagnetic sensor.

21. The mobile communication terminal according to claim 16, wherein the coordinate system includes a spatial three-axis coordinate system.

22. The mobile communication terminal according to claim 16, wherein execution of the platform-independent application using the detection result data includes displaying an action on a display of the mobile communication terminal that corresponds to a change in the at least one of position, direction, attitude and movement of the mobile communication terminal.

23. The mobile communication terminal according to claim 16, wherein execution of the platform-independent application using the detection result data includes causing at least a portion of the platform-independent application to stop executing in response to a change in the at least one of position, direction, attitude and movement of the mobile communication terminal.

* * * * *